US012676961B2

(12) United States Patent
Yang

(10) Patent No.: US 12,676,961 B2
(45) Date of Patent: Jul. 7, 2026

(54) DEVICE AND METHOD FOR DECODING VIDEO DATA BASED ON MATCHING TEMPLATE SIZE SELECTION

(71) Applicant: SHARP KABUSHIKI KAISHA, Sakai (JP)

(72) Inventor: Yu-Chiao Yang, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 55 days.

(21) Appl. No.: 18/756,593

(22) Filed: Jun. 27, 2024

(65) Prior Publication Data

US 2025/0008086 A1 Jan. 2, 2025

Related U.S. Application Data

(60) Provisional application No. 63/523,873, filed on Jun. 28, 2023.

(51) Int. Cl.
 *H04N 19/105* (2014.01)
 *H04N 19/117* (2014.01)
 *H04N 19/176* (2014.01)
(52) U.S. Cl.
 CPC ......... *H04N 19/105* (2014.11); *H04N 19/117* (2014.11); *H04N 19/176* (2014.11)
(58) Field of Classification Search
 CPC .. H04N 19/105; H04N 19/117; H04N 19/176; H04N 19/82
 See application file for complete search history.

(56) References Cited

U.S. PATENT DOCUMENTS

| | | | | |
|---|---|---|---|---|
| 9,544,596 | B1 * | 1/2017 | Han | H04N 19/61 |
| 12,445,596 | B2 * | 10/2025 | Li | H04N 19/105 |
| 2013/0101018 | A1 * | 4/2013 | Chong | H04N 19/82 |
| | | | | 375/E7.026 |
| 2024/0357078 | A1 * | 10/2024 | Lin | H04N 19/593 |

(Continued)

OTHER PUBLICATIONS

Series H: Audiovisual and Multimedia Systems Infrastructure of audiovisual services—Coding of moving video, Versatile video coding, ITU-T H.266 (Apr. 2022).

(Continued)

*Primary Examiner* — Jessica M Prince
(74) *Attorney, Agent, or Firm* — ScienBiziP, P.C.

(57) ABSTRACT

A method of decoding video data performed by an electronic device is provided. The method receives the video data and determines a block unit from a current frame included in the video data. The method further selects, for the block unit, multiple reference matching blocks from the current frame, determines, from the current frame, a current matching template, neighboring the block unit, and multiple reference matching templates, and determines multiple reference filter models. Each of the reference matching templates neighbors a corresponding one of the reference matching blocks. Each of the reference filter models is derived based on a corresponding one of the reference matching templates and associated with a corresponding one of the reference matching blocks. The method then filters the reference matching blocks based on the reference filter models to generate multiple filtered reference blocks, and reconstructs the block unit based on the filtered reference blocks.

16 Claims, 9 Drawing Sheets

100

(56) References Cited

U.S. PATENT DOCUMENTS

2024/0357096 A1 * 10/2024 Ruiz Coll ............... H04N 19/14
2025/0294166 A1 *  9/2025 Yan ....................... H04N 19/184

OTHER PUBLICATIONS

Muhammed Coban et al., "Algorithm description of Enhanced Compression Model 8 (ECM 8)", JVET-AC2025, Joint Video Experts Team (JVET) of ITU-T SG 16 WP 3 and ISO/IEC JTC 1/SC 29, 29th Meeting, by teleconference, Jan. 11-20, 2023.
Adrian Browne et al., "Algorithm description for Versatile Video Coding and Test Model 19 (VTM19)", JVET-AC2002-v1, Joint Video Experts Team (JVET) of ITU-T SG 16 WP 3 and ISO/IEC JTC 1/SC 29, 29th Meeting, Teleconference, Jan. 11-20, 2023.

* cited by examiner

Bitstream

Decoder Module 124

Prediction Processing Unit 2242

Inter Prediction Unit 22422

Intra Prediction Unit 22421

Decoded Picture Buffer 2246

Entropy Decoding Unit 2241

Inverse Quantization/ Inverse Transform Unit 2243

2244

Filtering Unit 2245

Decoded Video

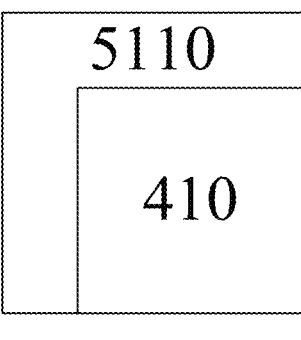
FIG. 5A
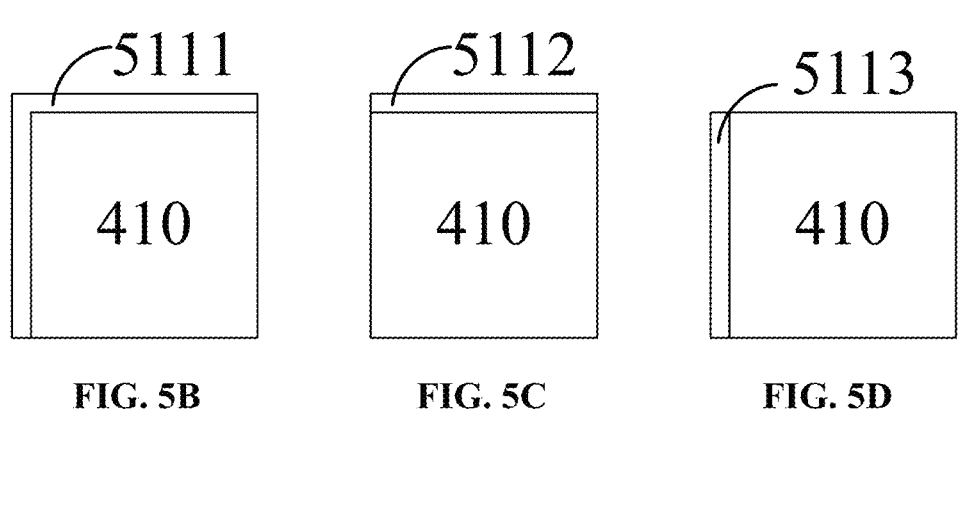
FIG. 5B        FIG. 5C        FIG. 5D
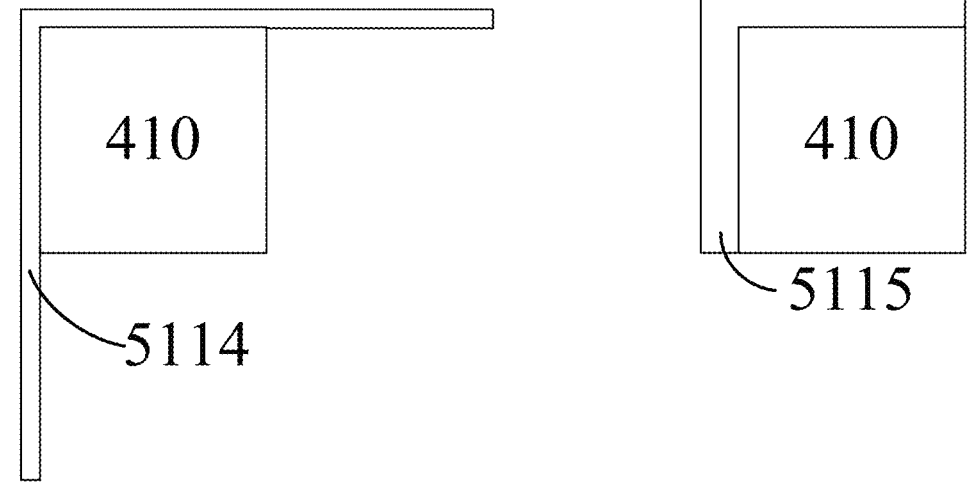
FIG. 5E                   FIG. 5F

DEVICE AND METHOD FOR DECODING VIDEO DATA BASED ON MATCHING TEMPLATE SIZE SELECTION

CROSS-REFERENCE TO RELATED APPLICATION(S)

The present disclosure claims the benefit of and priority to U.S. Provisional Patent Application Ser. No. 63/523,873, filed on Jun. 28, 2023, entitled "On Intra Template Matching," the content of which is hereby incorporated herein fully by reference in its entirety for all purposes.

FIELD

The present disclosure generally relates to video coding, and more specifically, to techniques for predicting a block unit based on multiple reference matching blocks and multiple reference filter models.

BACKGROUND

Intra template matching prediction (IntraTMP) is a coding tool for video coding, in which, an encoder and/or a decoder may search, from a current frame, a reference block of a current block within a search area of the current block in the current frame, and predict the current block based on the reference block.

In addition, the encoder and/or the decoder may derive a prediction model of the current block based on several template samples reconstructed prior to the reconstruction of the current block. It may be difficult, however, to correctly predict the current block only based on the prediction model of the current block. As such, the coding efficiency may be decreased when a prediction mode using the prediction model is used to predict most blocks in the current frame.

Thus, different kinds of refinement modes may be required for the encoder and/or the decoder to be able to precisely and efficiently predict and/or reconstruct the current block.

SUMMARY

The present disclosure is directed to a device and method for predicting a block unit based on multiple reference matching blocks and multiple reference filter models.

In a first aspect of the present disclosure, a method of decoding video data and an electronic device for performing the method are provided. The method includes receiving the video data; determining a block unit from a current frame included in the video data; selecting, for the block unit, multiple reference matching blocks from the current frame; determining, from the current frame, a current matching template, neighboring the block unit, and multiple reference matching templates, each neighboring, respectively, a corresponding one of the multiple reference matching blocks; determining multiple reference filter models, each respectively derived based on the current matching template and a corresponding one of the multiple reference matching templates; filtering the multiple reference matching blocks based on the multiple reference filter models to generate multiple filtered reference blocks; and reconstructing the block unit based on the multiple filtered reference blocks.

An implementation of the first aspect of the present disclosure further includes determining multiple reference candidate blocks from a search area of the block unit included in the current frame; determining, from the current frame, a current candidate template, neighboring the block unit, and multiple reference candidate templates, each neighboring, respectively, a corresponding one of the multiple reference candidate blocks; and determining multiple reference template costs, each respectively generated by comparing a corresponding one of the multiple reference candidate templates with the current candidate template, wherein selecting the multiple reference matching blocks from the search area of the block unit is further based on the multiple reference template costs.

In an implementation of the first aspect of the present disclosure, a candidate template size of the current candidate template is different from a matching template size of the current matching template.

In an implementation of the first aspect of the present disclosure, the multiple reference filter models are multiple linear filter models, each including a set of linear filter coefficients.

In an implementation of the first aspect of the present disclosure, each set of linear filter coefficients in the multiple reference filter models is different from other sets of linear filter coefficients in the plurality of reference filter models.

In an implementation of the first aspect of the present disclosure, each of the multiple filtered reference blocks is respectively generated by filtering one of the multiple reference matching blocks based on one of the multiple reference filter models associated with the one of the multiple reference matching blocks.

An implementation of the first aspect of the present disclosure further includes weightedly combining the multiple filtered reference blocks to generate a predicted block, wherein reconstructing the block unit is further based on the predicted block.

An implementation of the first aspect of the present disclosure further includes comparing each of the multiple reference matching templates with the current matching template to generate a corresponding one of multiple comparing results; and determining multiple weighting parameters based on the multiple comparing results, wherein weightedly combining the multiple filtered reference blocks is further based on the multiple weighting parameters.

In an implementation of the first aspect of the present disclosure, the current matching template and the plurality of reference matching templates have a first matching template size when a block size of the block unit is greater than or equal to a threshold size, the current matching template and the plurality of reference matching templates have a second matching template size when a block size of the block unit is less than the threshold size, and the second matching template size is greater than the first matching template size.

In an implementation of the first aspect of the present disclosure, the current matching template and the multiple reference matching templates have a first matching template size when a block size of the block unit is greater than or equal to a threshold size, the current matching template and the multiple reference matching templates have a second matching template size when a block size of the block unit is less than the threshold size, and the second matching template size is greater than the first matching template size.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

FIGS. 5A-5F are schematic illustrations of a block unit and multiple current matching templates, in accordance with one or more example implementations of this disclosure.

DETAILED DESCRIPTION

Figure 1:
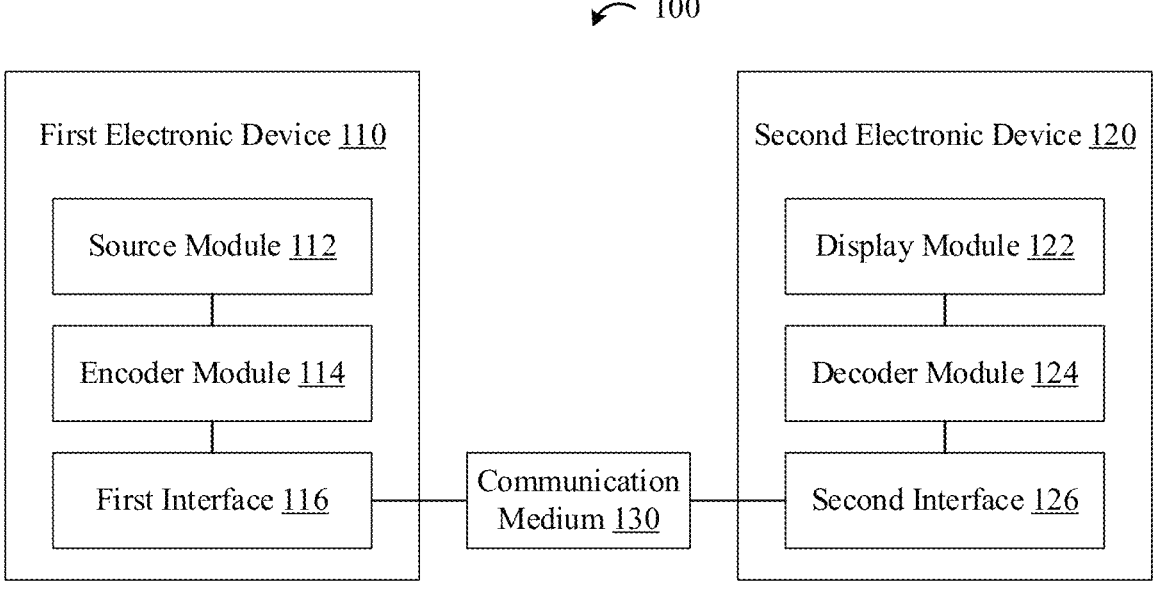
FIG. 1 is a block diagram illustrating a system having a first electronic device and a second electronic device for encoding and decoding video data, in accordance with one or more example implementations of this disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having one or more computer-executable instructions stored on a computer-readable medium, such as memory or other types of storage devices. For example, one or more microprocessors or general-purpose computers with communication processing capability may be programmed with computer-executable instructions and perform the disclosed function (s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-executable instructions. The computer-readable medium may be a non-transitory computer-readable medium.

FIG. 1 is a block diagram illustrating a system 100 having a first electronic device and a second electronic device for encoding and decoding video data, in accordance with one or more example implementations of this disclosure.

The system 100 includes a first electronic device 110, a second electronic device 120, and a communication medium 130.

The first electronic device 110 may be a source device including any device configured to encode video data and transmit the encoded video data to the communication medium 130. The second electronic device 120 may be a destination device including any device configured to receive encoded video data via the communication medium 130 and decode the encoded video data.

The first electronic device 110 may communicate via wire, or wirelessly, with the second electronic device 120 via the communication medium 130. The first electronic device 110 may include a source module 112, an encoder module 114, and a first interface 116, among other components. The second electronic device 120 may include a display module 122, a decoder module 124, and a second interface 126, among other components. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive the video from a video content provider. The source module 112 may generate computer graphics-based data, as the source video, or may generate a combination of live video, archived video, and computer-generated video, as the source video. The video capture device may include a charge-coupled device (CCD) image sensor, a complementary metal-oxide-semiconductor (CMOS) image sensor, or a camera.

The encoder module 114 and the decoder module 124 may each be implemented as any one of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the stored computer-executable instructions using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure(s) that may be used to interconnect peer devices.

The display module 122 may include a display using liquid crystal display (LCD) technology, plasma display technology, organic light-emitting diode (OLED) display technology, or light-emitting polymer display (LPD) technology, with other display technologies used in some other implementations. The display module 122 may include a High-Definition display or an Ultra-High-Definition display.

Figure 2:
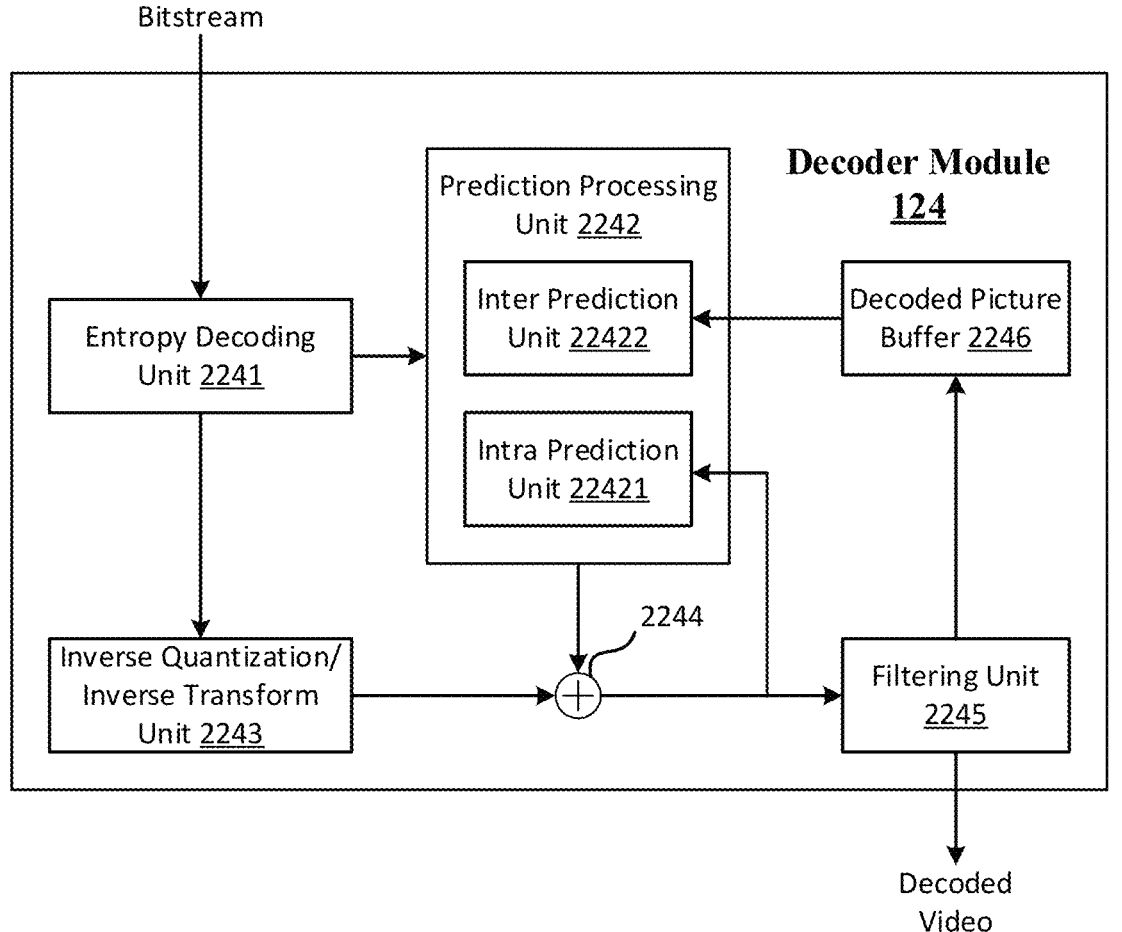
FIG. 2 is a block diagram illustrating a decoder module of the second electronic device illustrated in FIG. 1, in accordance with one or more example implementations of this disclosure.

FIG. 2 is a block diagram illustrating a decoder module 124 of the second electronic device 120 illustrated in FIG. 1, in accordance with one or more example implementations of this disclosure. The decoder module 124 may include an entropy decoder (e.g., an entropy decoding unit 2241), a prediction processor (e.g., a prediction processing unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction processing unit 2242 further may include an intra prediction processor (e.g., an intra prediction unit 22421) and an inter prediction processor (e.g., an inter prediction unit 22422). The decoder module 124 receives a bitstream, decodes the bitstream, and outputs a decoded video.

The entropy decoding unit 2241 may receive the bitstream including multiple syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and/or other syntax information.

The entropy decoding unit 2241 may perform context-adaptive variable length coding (CAVLC), context-adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction processing unit 2242.

The prediction processing unit 2242 may receive syntax elements, such as motion vectors, intra modes, partition information, and other syntax information, from the entropy decoding unit 2241. The prediction processing unit 2242 may receive the syntax elements including the partition information and divide image frames according to the partition information.

Each of the image frames may be divided into at least one image block, according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), subdivisions thereof, and/or other equivalent coding units.

During the decoding process, the prediction processing unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame, as the current block unit, based on syntax elements related to the intra mode, in order to generate a predicted block. The intra mode may specify the location of reference samples selected from the neighboring blocks within the current frame. The intra prediction unit 22421 may reconstruct multiple chroma components of the current block unit, based on multiple luma components of the current block unit, when the multiple chroma components is reconstructed by the prediction processing unit 2242.

The intra prediction unit 22421 may reconstruct multiple chroma components of the current block unit based on the multiple luma components of the current block unit when the multiple luma components of the current block unit is reconstructed by the prediction processing unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit may be a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as a discrete cosine transform (DCT), a discrete sine transform (DST), an adaptive multiple transform (AMT), a mode-dependent non-separable secondary transform (MDNSST), a Hypercube-Givens transform (HyGT), a signal-dependent transform, a Karhunen-Loéve transform (KLT), a wavelet transform, an integer transform, a sub-band transform, or a conceptually similar transform. The inverse transformation may convert the residual information from a transform domain, such as a frequency domain, back to the pixel domain, etc. The degree of inverse quantization may be modified by adjusting a quantization parameter.

The summer 2244 may add the reconstructed residual block to the predicted block, provided by the prediction processing unit 2242, to produce a reconstructed block.

The filtering unit 2245 may include a deblocking filter, a sample adaptive offset (SAO) filter, a bilateral filter, and/or an adaptive loop filter (ALF) to remove the blocking artifacts from the reconstructed block. Additional filters (in loop or post loop) may also be used in addition to the deblocking filter, the SAO filter, the bilateral filter, and the ALF. Such filters (are not explicitly illustrated for brevity of the description) may filter the output of the summer 2244. The filtering unit 2245 may output the decoded video to the display module 122, or other video receiving units, after the filtering unit 2245 performs the filtering process for the reconstructed blocks of the specific image frame.

The decoded picture buffer 2246 may be a reference picture memory that stores the reference block to be used by the prediction processing unit 2242 in decoding the bitstream (e.g., in inter-coding modes). The decoded picture buffer 2246 may be formed by any one of a variety of memory devices, such as a dynamic random-access memory (DRAM), including synchronous DRAM (SDRAM), magneto-resistive RAM (MRAM), resistive RAM (RRAM), or other types of memory devices. The decoded picture buffer 2246 may be on-chip along with other components of the decoder module 124, or may be off-chip relative to those components.

Figure 3:
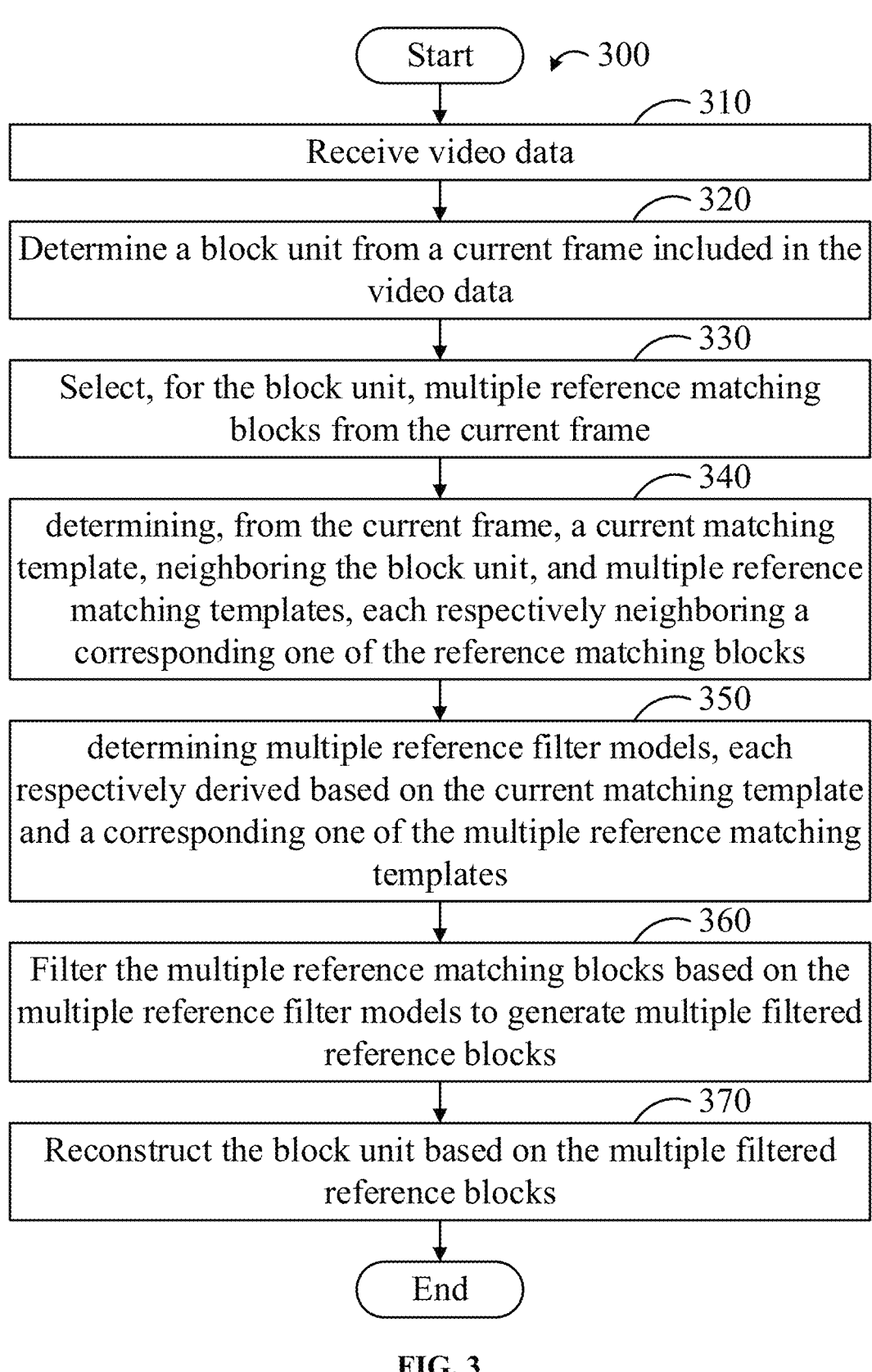
FIG. 3 is a flowchart illustrating a method/process for decoding and/or encoding video data by an electronic device, in accordance with one or more example implementations of this disclosure.

FIG. 3 is a flowchart illustrating a method/process 300 for decoding and/or encoding video data by an electronic device, in accordance with one or more example implementations of this disclosure. The method/process 300 is an example implementation, as there may be a variety of ways of decoding the video data.

The method/process 300 may be performed by an electronic device using the configurations illustrated in FIGS. 1 and/or 2, where various elements of these figures may be referenced to describe the method/process 300. Each block illustrated in FIG. 3 may represent one or more processes, methods, or subroutines performed by an electronic device.

The order in which the blocks appear in FIG. 3 is for illustration only, and may not be construed to limit the scope of the present disclosure, thus the order may be different from what is illustrated. Additional blocks may be added or fewer blocks may be utilized without departing from the scope of the present disclosure.

At block 310, the method/process 300 may start by the decoder module 124 receiving the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126. The second interface 126 may directly provide the bitstream to the decoder module 124 in some implementations.

At block 320, the decoder module 124 may determine a block unit from a current frame included in the video data.

With reference to FIGS. 1 and 2, the decoder module 124 may determine the image frames included in the bitstream when the video data received by the decoder module 124 is the bitstream. The current frame may be one of the image frames determined according to the bitstream. The decoder module 124 may further divide the current frame to determine the block unit, according to partition indications in the bitstream. For example, the decoder module 124 may divide the current frame to generate multiple CTUs, and further divide a current CTU included in the CTUs to generate multiple divided blocks, and to determine the block unit from the divided blocks according to the partition indications and based on any video coding standard. The size of the block unit may be calculated as Wbx Hb. In some implementations, the values Wb and Hb may be positive integers (e.g., 4, 8, etc.) that may be equal to, or different from, each other.

At block 330, the decoder module 124 may select, for the block unit, multiple reference matching blocks from the current frame.

The reference matching blocks may be selected based on multiple selection schemes. With reference to FIGS. 1 and 2, in some implementations, the decoder module 124 may determine multiple reference candidate blocks of the block unit from a search area of the block unit. The search area may be included in the current frame. Then, the decoder module 124 may select the reference matching blocks from the reference candidate blocks in an intra template matching prediction (IntraTMP) mode. The reference matching blocks may be selected based on multiple reference template costs. The reference candidate blocks may be arranged based on the reference template costs, and a subset of the arranged reference matching blocks may be selected as the reference matching blocks with or without additional parsing of any information from the bitstream for the selection. In some other implementations, the decoder 124 may determine multiple block vectors from the bitstream in an intra block copy (IBC) mode, and may directly determine the reference matching blocks based on the block vectors. Each of the reference matching blocks may be indicated by a corresponding one of the block vectors determined from the bitstream. It should be noted that the selection schemes may be changed without departing from the scope of the present disclosure.

The decoder module 124 may determine, from the current frame, the search area of the block unit. All samples in the search area may be reconstructed prior to the reconstruction of the block unit. Thus, the search area may include multiple reconstructed samples that are reconstructed prior to the reconstruction of the block unit. The shape and the size of the search area may be determined based on a location and the size of the block unit. The decoder module 124 may determine, for the block unit, the reference candidate blocks from the search area in the current frame. The sizes of the reference candidate blocks may be identical to the size of the block unit. Each of the reference candidate blocks may include some of the reconstructed samples reconstructed prior to the reconstruction of the block unit.

In some implementations, the decoder module 124 may determine a current candidate template, neighboring the block unit, from the current frame. In addition, the decoder module 124 may further determine multiple reference candidate templates from the current frame. Each of the reference candidate templates may neighbor, respectively, a corresponding one of the reference candidate blocks.

Figure 4:
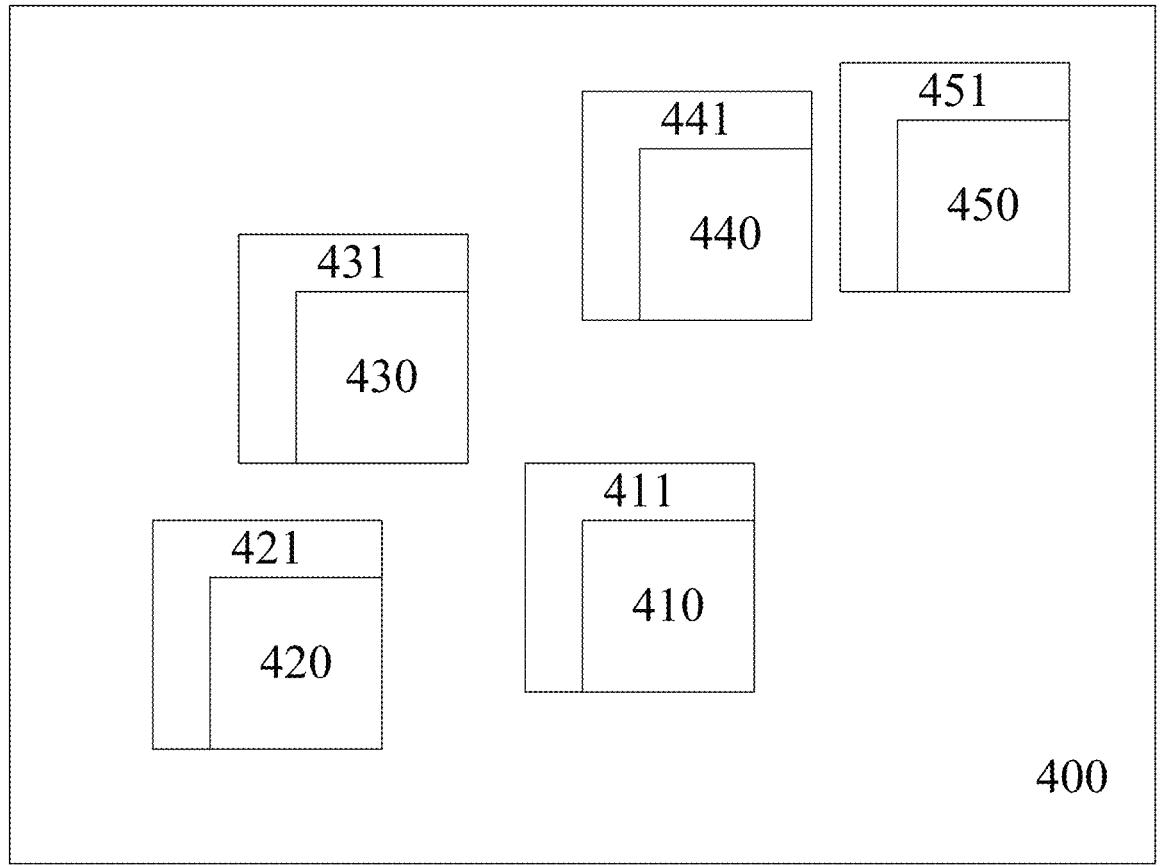
FIG. 4 is a schematic illustration of a block unit, a current candidate template, multiple reference candidate blocks, and multiple reference candidate templates, in accordance with one or more example implementations of this disclosure.

FIG. 4 is a schematic illustration of a block unit 410, a current candidate template 411, multiple reference candidate blocks 420-450, and multiple reference candidate templates 421-451, in accordance with one or more example implementations of this disclosure. The number of reference candidate blocks shown in FIG. 4 is for illustration only, and may not be construed to limit the scope of the present disclosure, thus may be different from what is illustrated. In addition, the number of reference candidate blocks may be determined based on the size of the search area.

In some implementations, the current candidate template 411 may be an L-shaped template, neighboring the block unit 410, and each of the reference candidate templates 421-451 may also be an L-shaped template, neighboring a corresponding one of the reference candidate templates 421-451. A candidate template size of the current candidate template 411 may be determined based on the size of the block unit 410. The shape and the size of the reference candidate templates 421-451 may be identical to those of the current candidate template 411. In some other implementations, the shape of the current candidate template 411 and the reference candidate templates 421-451 may be similar to a vertical line. Thus, the current candidate template 411 may be located on the left side of the block unit 410, and each of the reference candidate templates 421-451 may be located on the left side of a corresponding one of the reference candidate blocks 420-450. In yet, some other implementations, the shape of the current candidate template 411 and the reference candidate templates 421-451 may be similar to a horizontal line. Thus, the current candidate template 411 may be located above the block unit 410, and each of the reference candidate templates 421-451 may be located above a corresponding one of the reference candidate blocks 420-450.

The decoder module 124 may determine the reference template costs based on the reference candidate templates. Each of the reference template costs may be respectively generated by comparing a corresponding one of the reference candidate templates with the current candidate template. In addition, each of the reference template costs may be determined by calculating a difference between a corresponding one of the reference candidate templates with the current candidate template. Since the current candidate template and the reference candidate templates are reconstructed prior to the reconstruction of the block unit, the decoder module 124 may directly receive multiple reconstructed results of the current candidate template and the reference candidate templates for determining the reference template costs.

The difference between the reconstructed samples of the current candidate template and the reconstructed samples of the corresponding one of the reference candidate templates may be calculated using a Mean Squared Error (MSE) calculation. In addition, the difference between the reconstructed samples of the current candidate template and the reconstructed samples of the corresponding one of the reference candidate templates may be calculated using a Sum of Absolute Difference (SAD) calculation. In some implementations, the difference between the reconstructed samples of the current candidate template and the reconstructed samples of the corresponding one of the reference candidate templates may be calculated using a Sum of Absolute Transformed Difference (SATD) calculation. In some implementations, the difference between the reconstructed samples of the current candidate template and the reconstructed samples of the corresponding one of the reference candidate templates may be calculated using a mean-removed sum of absolute difference (MR-SAD) calculation.

The decoder module 124 may determine an arrangement of the reference candidate blocks based on the reference template costs, and select the reference matching blocks based on the determined arrangement of the reference candidate blocks. The decoder module 124 may reorder the reference candidate blocks based on the determined arrangement. In some implementations, the reference candidate blocks may be reordered in an ascending order or a descending order of the reference template costs.

Before the arrangement is determined based on the reference template costs, the reference candidate blocks may be ordered based on one or more arbitrary rules. The reference candidate blocks may be reordered in the ascending order of the reference template costs. Thus, a specific reference candidate block in the reference candidate blocks may be moved to be a first reference candidate block when the reference template cost of the specific reference candidate block is the minimum value of the reference template costs. In addition, the specific reference candidate block may be moved to be the last one of the reference candidate blocks when the reference template cost of the specific reference candidate block is the maximum value of the reference template costs. The arrangement may be further determined by adjusting the new order of the reference candidate blocks based on a diversity criterion. The decoder module 124 may determine a difference value between two of the reference template costs selected from two neighbors of the reference candidate blocks ordered in the new order. When the difference value is less than or equal to a diversity threshold, the last one of the two neighbors of the reference candidate blocks may be moved backward.

In some implementations, the decoder module 124 may select N reference candidate blocks, having the least reference template costs, from the reference candidate blocks, as the reference matching blocks. The number N, being a positive integer, may be equal to or less than the total number of the reference candidate blocks. For example, the number N may be equal to 2, 3, 4, 5, 6, 7, 15, or 24. In other words, the decoder module 124 may select the first to N-th reference candidate blocks ordered based on the determined arrangement when the reference candidate blocks are reordered in the ascending order of the reference template costs to generate the determined arrangement. Thus, the reference matching blocks may be selected from the search area based on the reference template costs without additional parsing of any information from the bitstream for the selection.

In some other implementations, each of the reference candidate blocks ordered based on the determined arrangement may have a reference candidate index. The encoder module 114 may select the N reference candidate blocks from the reference candidate blocks, as the reference matching blocks, using an encoding method, and then encode, into the bitstream, N reference candidate indices selected from the reference candidate indices and corresponding to the selected N reference candidate blocks. Thus, the decoder module 124 may determine the N reference candidate indices from the bitstream for selecting the reference matching blocks from the reference candidate blocks.

In yet, some other implementations, the decoder module 124 may divide a portion of the reference candidate blocks into multiple reference candidate groups. In some implementations, both of the encoder module 114 and the decoder module 124 may first select K reference candidate blocks having the least reference template costs from the reference candidate blocks, and then divide the K reference candidate blocks into the reference candidate groups. The number K, being a positive integer, may be greater than the number N. Each of the reference candidate groups may have a reference group index.

The encoder module 114 may select one of the reference candidate groups for determining the reference matching blocks using an encoding method, and then encode, into the bitstream, a specific reference group index selected from the reference group indices and corresponding to the selected reference candidate group. Thus, the decoder module 124 may determine the selected reference candidate group based on the specific reference group index from the bitstream for selecting the reference matching blocks included in the selected reference candidate group. In some implementations, the number of reference candidate blocks in each of the reference candidate groups may be equal to the number R. The number R, being a positive integer, may be less than the number K, and greater than or equal to the number N. For example, the number K may be equal to 15, and the number R may be equal to 5. In other words, the number of reference candidate groups may be equal to 3.

In some implementations, all of the reference candidate blocks in the selected reference candidate group may be determined as the reference matching blocks. In some other implementations, the decoder module 124 may further compare the reference template costs of the reference candidate blocks, in the selected reference candidate group, with a cost threshold. When a reference template cost of a specific one of the reference candidate blocks in the selected reference candidate group is less than or equal to the cost threshold, the specific reference candidate block may be determined, as one of the reference matching blocks. In addition, when the reference template cost of the specific reference candidate block in the selected reference candidate group is greater than the cost threshold, the specific reference candidate block may be excluded from the reference matching blocks.

In some implementations, the cost threshold may be determined based on the reference template costs of the reference candidate blocks in the selected reference candidate group. For example, the cost threshold may be equal to a threshold value generated by multiplying the minimum of the reference template costs of the reference candidate blocks, in the selected reference candidate group, by a predefined value, where the predefined value may be a positive value, such as 1.5, 2, 2.5, and 3. Thus, the number of reference matching blocks selected from the selected reference candidate group may be equal to 2, 3, 4, or 5 when the number R is equal to 5.

In some other implementations, the decoder 124 may determine multiple block vectors from the bitstream in an intra block copy (IBC) mode, and may directly determine the reference matching blocks based on the block vectors. Each of the reference matching blocks may be indicated by a corresponding one of the block vectors determined from the bitstream. The encoder module 114 may determine the block vectors for selecting the reference matching blocks using the encoding method, and then encode, into the bitstream, at least one of at least one IBC-related index or at least one IBC-related vector for each of the block vectors. Thus, the decoder module 124 may determine, from the bitstream, the at least one of the at least one IBC-related index or the at least one IBC-related vector for each of the block vectors for selecting the reference matching blocks indicated by the block vectors. In some implementations, the at least one of the IBC-related index or the IBC-related value may be signaled by the encoder module 114 in an IBC advanced motion vector prediction (AMVP) mode, an IBC skip mode, an IBC merge mode, and intraTMP merge mode. In the IBC skip mode and the IBC merge mode, the bitstream may include an IBC merge candidate index. In addition, in the IBC AMVP mode, the bitstream may include an IBC predictor index and a difference vector.

In the intraTMP merge mode, the decoder module 124 may collect block vectors of multiple neighboring blocks adjacent or non-adjacent the block unit, and determine multiple reference neighboring blocks based on the collected block vectors. Then, the reference matching blocks may be selected from the reference neighboring blocks based on multiple neighboring template costs, each generated by comparing a corresponding one of multiple reference neighboring templates, each neighboring a corresponding one of the reference neighboring blocks, with the current candidate template. Thus, in the intraTMP merge mode, the IBC-related index and the IBC-related vector may be excluded from the bitstream. It should be noted that the signaling scheme in the bitstream for the IBC mode may be changed without departing from the scope of the present disclosure.

Referring back to FIG. 3, at block 340, the decoder module 124 may determine, from the current frame, a current matching template, neighboring the block unit, and multiple reference matching templates, each neighboring, respectively, a corresponding one of the multiple reference matching blocks.

With reference to FIGS. 1 and 2, in some implementations, the decoder module 124 may determine the current matching template, neighboring the block unit, from the current frame. In addition, the decoder module 124 may further determine the reference matching templates from the current frame. Each of the reference matching templates may neighbor, respectively, a corresponding one of the reference matching blocks. The shape and the size of the reference matching templates may be identical to those of the current matching template.

In some implementations, the shape and the size of the current matching template may be identical to those of the current candidate template. In some other implementations, the shape and the size of the current matching template may be different from those of the current candidate template. FIGS. 5A-5F are schematic illustrations of a block unit 410 and multiple current matching templates 5110-5115, in accordance with one or more example implementations of this disclosure. With reference to FIGS. 4 and 5A, in some implementations, the shape and the size of the current matching template 5110 may be identical to those of the current candidate template 411. With reference to FIGS. 4, 5B, 5E, and 5F, in some other implementations, the shape of the current matching templates 5111, 5114, and 5115 may be identical, or similar, to that of the current candidate template 411, but the size of the current matching templates 5111, 5114, and 5115 may be totally different from that of the current candidate template 411. With reference to FIGS. 4, 5C, and 5D, in yet, some other implementations, the shape and the size of the current matching templates 5112 and 5113 may be different from those of the current candidate template 411. It should be noted that the shape and the size of the current matching template may be changed without departing from the scope of the present disclosure.

In some implementations, the current matching template may be an L-shaped template, neighboring the block unit, and each of the reference matching templates may also be an L-shaped template, neighboring a corresponding one of the reference matching blocks. A matching template size of the current matching template may be determined based on the size of the block unit. In addition, the candidate template size of the current candidate template may be different from the matching template size of the current matching template. The current candidate template may include a top current candidate template located above the block unit, a left current candidate template located on the left side of the block unit, and a top-left current candidate template located on the top-left side of the block unit. In addition, the current matching template may include a top current matching template located above the block unit, a left current matching template located on the left side of the block unit, and a top-left matching candidate template located on the top-left side of the block unit.

The width of the top current candidate template may be equal to Wct, and the width of the top current matching template may be equal to Wmt. The parameters Wct and Wmt, being positive integers, may be determined based on the width Wb of the block unit. For example, the parameter Wct may be equal to Wb or 2Wb. In addition, the parameter Wmt may also be equal to Wb or 2Wb. The height of the top current candidate template may be equal to Hct, and the height of the top current matching template may be equal to Hmt. The parameters Hct and Hmt, being positive integers, may be predefined. For example, the parameter Wct may be equal to 2 or 4. In addition, the parameter Wmt may be equal to 1, 2, 3, or 4.

The width of the left current candidate template may be equal to Wcl, and the width of the left current matching template may be equal to Wml. The parameters Wcl and Wml, being positive integers, may be predefined. For example, the parameter Wcl may be equal to 2 or 4. In addition, the parameter Wml may be equal to 1, 2, 3, or 4.

The height of the left current candidate template may be equal to Hcl, and the height of the left current matching template may be equal to Hml. The parameters Hcl and Hml, being positive integers, may be determined based on the height Hb of the block unit. For example, the parameter Hcl may be equal to Hb or 2Hb. In addition, the parameter Hml may be equal to Hb or 2Hb.

The width of the top-left current candidate template may be equal to Wcd, and the width of the top-left current matching template may be equal to Wmd. The height of the top-left current candidate template may be equal to Hcd, and the height of the top-left current matching template may be equal to Hmd. The parameters Wcd and Hcd, being positive integers, may be predefined to be equal to each other. For example, the parameters Wcd and Hcd may be equal to 2 or 4. In addition, the parameters Wmd and Hmd, being positive integers, may be predefined to be equal to each other. For example, the parameters Wmd and Hmd may be equal to 1, 2, 3, or 4.

In some other implementations, the current matching template and the reference matching templates may have a first matching template size when the size of the block unit is greater than or equal to a threshold size. In addition, the current matching template and the reference matching templates may have a second matching template size when the size of the block unit is less than the threshold size. The second matching template size may be greater than the first matching template size. In some implementations, the second matching template size may include the width Wmt equal to the width Wb, the height Hml equal to the height Hb, and the heights Hmt and Hmd and the widths Wml and Wmd, each being equal to 4, when the first matching template size include the width Wmt equal to the width Wb, the height Hml equal to the height Hb, and the heights Hmt and Hmd and the widths Wml and Wmd, each being equal to 2.

For example, the second matching template size of the current matching template may be identical to the size of the current matching templates 5115, when the first matching template size of the current matching template may be identical to the size of the current matching templates 5111. In addition, the size of the current matching templates 5115 may be larger than the size of the current matching templates 5111. In some other implementations, the second matching template size may include the width Wmt equal to the width 2×Wb, the height Hml equal to the height 2×Hb, and the heights Hmt and Hmd and the widths Wml and Wmd, each being equal to 2, when the first matching template size include the width Wmt equal to the width Wb, the height Hml equal to the height Hb, and the heights Hmt and Hmd and the widths Wml and Wmd, each being equal to 2. For example, the second matching template size of the current matching template may be identical to the size of the current matching templates 5114 when the first matching template size of the current matching template may be identical to the size of the current matching templates 5111.

In some implementations, the threshold size may be a threshold area. Thus, when an area Wb×Hb of the block unit is less than the threshold area, the size of the current matching template and reference matching templates may be identical to the second matching template size. In addition, when the area Wb×Hb of the block unit is greater than or equal to the threshold area, the size of the current matching template and reference matching templates may be identical to the first matching template size. For example, the threshold area may be 32×32 or 64×64. In some other implementations, the threshold size may be a length threshold.

In some implementations, when one of the weight Wb and the height Hb of the block unit is less than the length threshold, the size of the current matching template and reference matching templates may be identical to the second matching template size. In some other implementation, when all of the weight Wb and the height Hb of the block unit are less than the length threshold, the size of the current matching template and reference matching templates may be identical to the second matching template size. For example, the length threshold may be 16, 32, or 64. In yet, some other implementations, the threshold size may include the threshold area and the length threshold. In some implementations, when the area Wb×Hb of the block unit is less than the threshold area and one of the weight Wb and the height Hb of the block unit is less than the length threshold, the size of the current matching template and reference matching templates may be identical to the second matching template size. In some other implementations, when the area Wb×Hb of the block unit is less than the threshold area and all of the weight Wb and the height Hb of the block unit are less than the length threshold, the size of the current matching template and reference matching templates may be identical to the second matching template size.

In some implementations, the bitstream may include an IntraTMP template index for indicating which one of the shapes of the reference candidate templates may be used for selecting the reference matching blocks. In some implementations, the IntraTMP template index may further indicate which one of the shapes of the reference matching templates may be used for deriving the reference filter models at the following block of the method/process 300. In some other implementations, the bitstream may further include a filter template index for indicating which one of the shapes of the reference matching templates may be used for deriving the reference filter models. In yet, some other implementations, the shape of the reference candidate templates may be determined based on the reference template costs or determined based on a predefined shape. Thus, the shape of the reference candidate templates may be determined without additional signaling or parsing of the IntraTMP template index. In addition, the shape of the reference matching templates corresponding to the determined shape of the reference candidate templates with the minimum reference template cost may be determined for deriving the reference filter models. Thus, the filter template index may also be excluded from the bitstream.

Referring back to FIG. 3, at block 350, the decoder module 124 may determine multiple reference filter models, each respectively derived based on the current matching template and a corresponding one of the multiple reference matching templates. In addition, each of the reference filter models may be associated, respectively, with a corresponding one of the reference matching blocks.

With reference to FIGS. 1 and 2, the decoder module 124 may determine a reference filter model for each of the reference matching templates. Each of the reference filter models may be generated by one of multiple filter types. A filter type of one of the reference filter models may be identical to or different from a filter type of another one of the reference filter models. Thus, in some implementations, the filter types of the reference filter models may be identical to each other. In some other implementations, the filter types of the reference filter models may be different from each other. In yet, some other implementations, the filter type of one reference filter model may be identical to the filter types of a portion of the reference filter models and different from the filter types of the other portion of the reference filter models.

Figure 6:
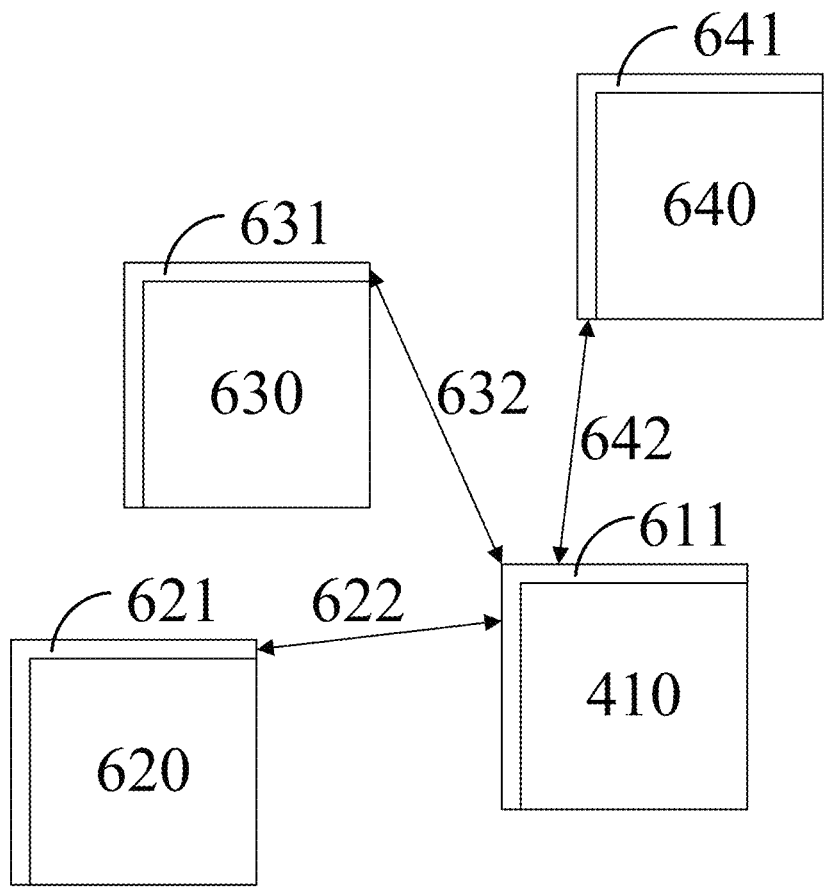
FIG. 6 is a schematic illustration of a block unit, the reference matching blocks, the current matching template, the reference matching templates, and the reference filter models, in accordance with one or more example implementations of this disclosure.

FIG. 6 is a schematic illustration of a block unit 410, the reference matching blocks 620-640, the current matching template 611, the reference matching templates 621-641, and the reference filter models 622-642, in accordance with one or more example implementations of this disclosure. The reference matching blocks 620-640 may be selected from the reference candidate blocks. The reference filter model 622 may be derived based on the current matching template 611 and the reference matching template 621. The reference filter model 632 may be derived based on the current matching template 611 and the reference matching template 631. The reference filter model 642 may be derived based on the current matching template 611 and the reference matching template 641. Each of the reference filter models 622-642 may be different from each other. In some other implementations, the reference filter model 622 may be identical to one of the reference filter models 632 and 642 when the reference matching template 621 is identical to one of the reference matching templates 631 and 641 corresponding to the one of the reference filter models 632 and 642.

The filter types may include a linear filter model and a non-linear filter model. The linear filter model may include an Nf-tap liner model and a gradient linear model. The number Nf, being a positive integer, may be predefined. For example, the number Nf may be equal to 2, 3, 4, 5, 7, or 9. The non-linear filter model may include a quadratic model, a cubic model, and a quartic model. In some implementations, when a degree of a reference filter model is equal to one, the reference filter model is one of the linear filter models. In some implementations, when the degree of the filter model is greater than one, the reference filter model is one of the non-linear filter models. For example, since the quartic model includes a square term, the quartic model may be included in the non-linear filter modes. It should be noted that additional reference filters may be added without departing from the scope of the present disclosure.

In some implementations, the filter type of the reference filter model of a specific one of the reference matching blocks may be a 5-tap linear model. The 5-tap linear model may include five spatial sample terms and one bias term B. The five spatial sample terms may include a center sample C located at a sample position (i, j) relative to the top-left luma sample of the specific reference matching block, a north sample N located at a sample position (i, j−1) relative to the top-left luma sample of the specific reference matching block and located above the center sample C, and a south sample S located at a sample position (i, j+1) relative to the top-left luma sample of the specific reference matching block and located below the center sample C. In addition, the five spatial sample terms may further include a west sample W located at a sample position (i−1, j) relative to the top-left luma sample of the specific reference matching block and located on the left side of the center sample C, and an east sample E located at a sample position (i+1, j) relative to the top-left luma sample of the specific reference matching block and located on the right side of the center sample C. Thus, the 5-tap linear model may be shown in the following function:

$$predLumaVal = c_0 \times C + c_1 \times N + c_2 \times S + c_3 \times E + c_4 \times W + c_5 \times B$$

where the coefficients $c_0$, $c_1$, $c_2$, $c_3$, $c_4$, and $c_5$ are six linear filter coefficients for the spatial sample terms C, N, S, W, and E, and the bias term B, and predLumaVal may be a predicted luma sample located at a sample position (i, j) relative to the top-left luma sample of the block unit.

In some implementations, the filter type of the reference filter model of the specific reference matching block may be the gradient linear model. The gradient linear model may include at least one gradient term G and a bias term B. The at least one gradient term G may be generated by calculating a gradient value of the center sample located at the sample position (i, j) relative to the top-left luma sample of the specific reference matching block. In some implementations, the gradient term may be a horizontal gradient $G_x$ by calculating the gradient value of the center sample along an x-axis. In some other implementations, the gradient term may be a vertical gradient $G_y$ by calculating the gradient value of the center sample along a y-axis. In yet, some other implementations, the gradient term may be a spatial gradient G by calculating the gradient value of the center sample. Thus, the gradient linear model may be shown in the following function:

$$predLumaVal = (c_0 \times G) \gg k + c_1$$

where the coefficients $c_0$ and $c_1$ are two linear filter coefficients for the gradient term G and the bias term B equal to 1, the coefficient k may be a shift value, and predLumaVal may be a predicted luma sample located at a sample position (i, j) relative to the top-left luma sample of the block unit.

In some implementations, the filter type of the reference filter model of the specific reference matching block may be the gradient linear model. The gradient linear model may include at least one gradient term G, and at least one spatial sample term, and a bias term B. Thus, the gradient linear model may be shown in one of the four following functions:

$$predLumaVal = c_0 \times C + c_1 \times N + c_2 \times S + c_3 \times E + c_4 \times W + c_5 \times G + c_6 \times B$$

$$predLumaVal = c_0 \times C + c_1 \times N + c_2 \times S +$$
$$c_3 \times E + c_4 \times W + c_5 \times G + c_6 \times X + c_7 \times Y + c_8 \times B$$

$$predLumaVal = c_0 \times C + c_1 \times G_x + c_2 \times G_y + c_3 \times X + c_4 \times Y + c_5 \times B$$

$$predLumaVal =$$
$$c_0 \times C + c_1 \times G + c_2 \times G_x + c_3 \times G_y + c_4 \times X + c_5 \times Y + c_6 \times B$$

where the coefficients $c_0$, $c_1$, $c_2$, $c_3$, $c_4$, $c_5$, $c_6$, $c_7$, and $c_8$ are nine linear filter coefficients for the at least one spatial sample term, the at least one gradient term, and the bias term B, and predLumaVal may be a predicted luma sample located at a sample position (i, j) relative to the top-left luma sample of the block unit. In addition, the terms Y and X may be the vertical and horizontal positions relative to the center luma sample of the current block.

In some implementations, the filter type of the reference filter model of the specific reference matching block may be the quadratic model. The quadratic model including five spatial sample terms, a non-linear term P and one bias term B may be similar to a convolutional cross-component model (CCCM). The five spatial sample terms may include the center sample C, the north sample N, the south sample S, the west sample W, and the east sample E. Thus, the quadratic model may be shown in the following functions:

$$predLumaVal = c_0 \times C + c_1 \times N + c_2 \times S + c_3 \times E + c_4 \times W + c_5 \times P + c_6 \times B$$

$$P = (C \times C + midVal) \gg bitDepth$$

$$B = 2^{bitDepth-1}$$

where the coefficients $c_0$, $c_1$, $c_2$, $c_3$, $c_4$, $c_5$, and $c_6$ are seven filter coefficients for the spatial sample terms C, N, S, W, and E, the non-linear term P, and the bias term B, and predLumaVal may be a predicted luma sample located at a sample position (i, j) relative to the top-left luma sample of the block unit. In addition, the parameter midVal and the bias term B may be set as to a middle luma value, the parameter bitDepth may be a bit depth of the samples in the bitstream. For example, the bias term B may be set as 512 for 10 bits content.

Each of the filter types of the reference filter models may be a linear filter model. In addition, each of the linear filter models may include a set of linear filter coefficients $c_0$, $c_1$, ..., $c_{n-2}$, and $c_{n-1}$. The number n, being a positive integer, may be equal to the number of terms in a corresponding one of the reference filter models. In some implementations, the sets of linear filter coefficients in the reference filter models may be different from each other, since each of the linear filter models is generated by different reference matching templates. In some other implementations, a set of linear filter coefficients in a first specific one of the reference filter models may be identical to another set of linear filter coefficients in a second specific one of the reference filter models when a first specific one of the reference matching blocks corresponding to the first specific reference filter model is identical to a second specific one of the reference matching blocks corresponding to the second specific reference filter model.

The set of filter coefficients may be derived by comparing the reconstructed samples of the current matching template with multiple predicted samples of the current matching template generated based on one of the reference candidate templates. In some implementations, the difference minimization of the comparison may be performed by an MSE minimization. In some implementations, the MSE minimization may be performed by calculating an autocorrelation matrix for the one of the reference candidate templates and a cross-correlation vector between the one of the reference candidate templates and current matching template. The autocorrelation matrix may be LDL decomposition and the convolution filter coefficients may be calculated using back-substitution. In some implementations, the decomposition may be Cholesky decomposition. In some implementations, the difference minimization may be performed by a Gaussian elimination. It should be noted that the derivation scheme for the set of filter coefficients may be changed without departing from the scope of the present disclosure.

Referring back to FIG. 3, at block 360, the decoder module 124 may filter the multiple reference matching blocks based on the multiple reference filter models to generate multiple filtered reference blocks.

With reference to FIGS. 1 and 2, the decoder module 124 may filter each of the reference matching blocks based on a corresponding one of the reference filter models to generate a corresponding one of the filtered reference blocks. For example, with reference to FIG. 6, the decoder module 124 may filter the reference matching block 620 using the reference filter model 622 to generate a first filtered reference block for the block unit. The decoder module 124 may filter the reference matching block 630 using the reference filter model 632 to generate a second filtered reference block for the block unit. In addition, the decoder module 124 may filter the reference matching block 640 using the reference filter model 642 to generate a third filtered reference block for the block unit. Thus, each of the filtered reference blocks may be respectively generated by filtering a corresponding one of the reference matching blocks based on a corresponding one of the reference filter models corresponding to the corresponding reference matching block.

In some implementations, the first to the third filtered reference blocks may be different from each other when the reference filter models 622-642 are different from each other. In some other implementations, when the reference filter model 622 is identical to one of the reference filter models 632 and 642 and the reference matching block 620 is different from one of the reference matching blocks 630 and 640 corresponding to the one of the reference filter models 632 and 642, the first filtered reference block may be different from one of the second and the third filtered reference blocks corresponding to the one of the reference filter models 632 and 642. In yet, some other implementations, when the reference filter model 622 is identical to one of the reference filter models 632 and 642 and the reference matching block 620 is also identical to one of the reference matching blocks 630 and 640 corresponding to the one of the reference filter models 632 and 642, the first filtered reference block may be identical to one of the second and the third filtered reference blocks corresponding to the one of the reference filter models 632 and 642.

Referring back to FIG. 3, at block 370, the decoder module 124 may reconstruct the block unit based on the multiple filtered reference blocks.

With reference to FIGS. 1 and 2, in some implementations, the decoder module 124 may weightedly combine the filtered reference blocks to generate a predicted block. The predicted block may be used to reconstruct the block unit. In addition, the decoder module 124 may weightedly combine the filtered reference blocks to generate the predicted block further based on multiple weighting parameters. The weighting parameters may be derived based on multiple schemes. It should be noted that the derivation scheme of the weighting parameters may be changed without departing from the scope of the present disclosure. The decoder module 124 may determine the weighting parameters without parsing any index or flag from the bitstream. In some other implementations, the decoder module 124 may weightedly combine the filtered reference blocks with at least one of the reference matching blocks (i.e., the unfiltered reference matching blocks) to generate a predicted block. In addition, the decoder module 124 may weightedly combine the filtered reference blocks with the at least one of the reference matching blocks to generate the predicted block further based on multiple weighting values. The weighting values may be predefined.

In some implementations, the weighting parameters may be predefined. For example, in some implementations, each of the weighting parameters of the filtered reference blocks may be equal to 1/N. The number N may be equal to the number of reference matching blocks. In some implementations, a weighting parameter of a filtered reference block corresponding to a reference matching template having a lower reference template cost may be greater than another weighting parameter of another filtered reference block corresponding to another reference matching template having a higher reference template cost. Thus, the weighting parameters may be predefined based on the determined arrangement of the reference matching blocks.

In some other implementations, the decoder module may compare each of the reference matching templates with the current matching template to generate a corresponding one of multiple comparing results, and determine the weighting parameters based on the comparing results. The comparing results may be generated by calculating each of multiple offset values between a corresponding one of the reference matching templates and the current matching template. The offset values of the reference matching templates may be equal to $Offset_1$, $Offset_2$, $Offset_3$, ..., and $Offset_N$. The offset values may be calculated using one of the MSE calculation, the SAD calculation, the MR-SAD calculation, or the SATD calculation. It should be noted that the calculation scheme for the offset values may be changed without departing from the scope of the present disclosure. In addition, a sum of the offset values may be equal to Sum. Thus, in some implementations, the weighting parameter $W_k$ may be equal to $W_k$/Sum. For example, the weight parameter $W_1$ of the first filtered reference block corresponding to the first reference matching template may be equal to $W_1$/Sum. In some other implementations, the weighting parameter $W_k$ may be equal to $(Sum-Offset_k)/[(N-1) \times Sum]$. For example, the weight parameter $W_1$ of the first filtered reference block corresponding to the first reference matching template may be equal to $(Sum-Offset_1)/[(N-1) \times Sum]$. In some implementations, in order to reduce the complexity of the cost calculation, a division operation for the weighting parameter may be replaced by an integer look-up table (LUT).

In some implementations, the decoder module 124 may reconstruct the block unit based on the predicted block. The decoder module 124 may determine multiple residual components from the bitstream for the block unit and add the residual components into the predicted block to reconstruct the block unit. The decoder module 124 may reconstruct all of the other block units in the image frame for reconstructing the image frame and the video. The method/process 300 may then end.

Figure 7:
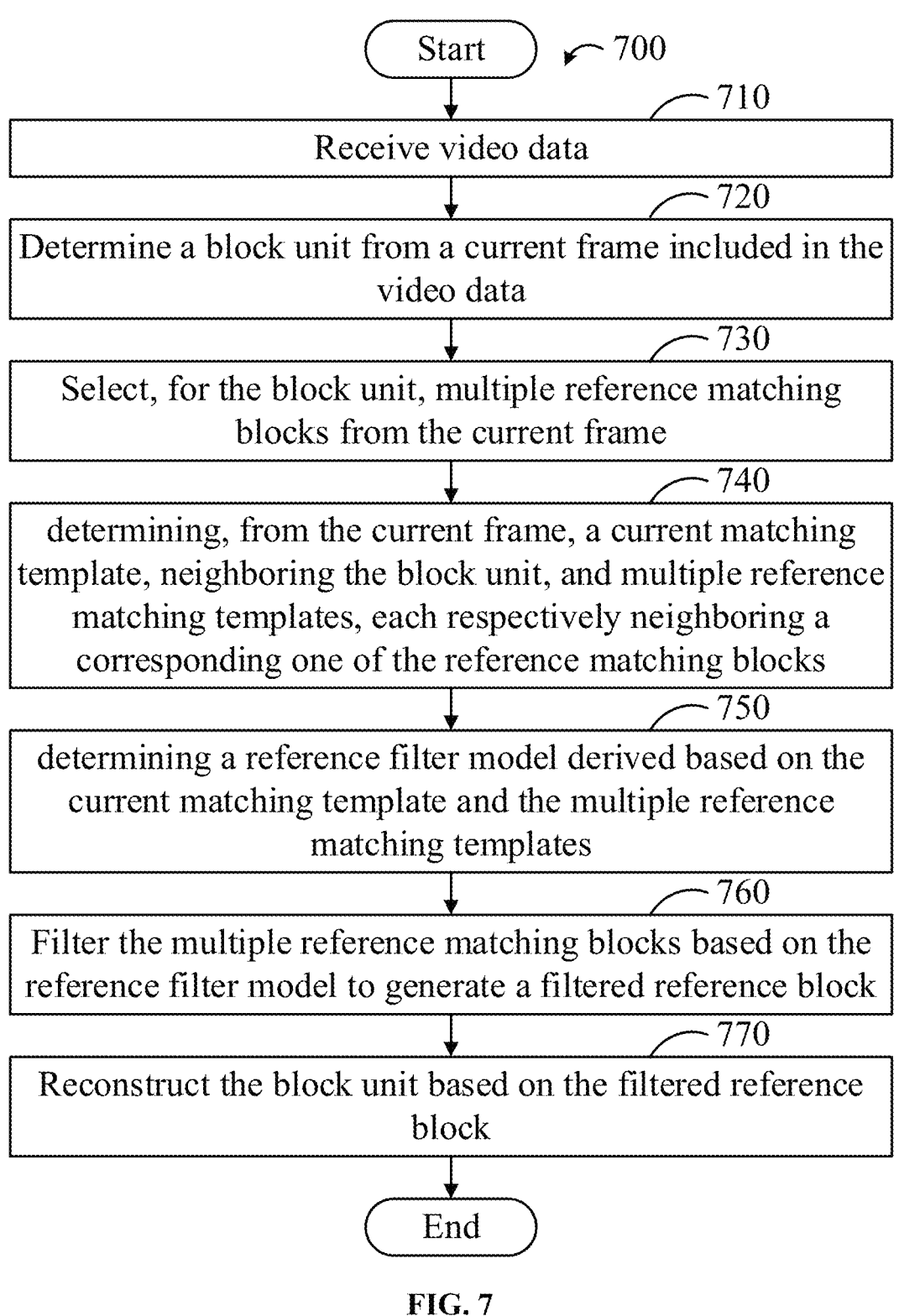
FIG. 7 is a flowchart illustrating a method/process for decoding and/or encoding video data by an electronic device, in accordance with one or more example implementations of this disclosure.

FIG. 7 is a flowchart illustrating a method/process 700 for decoding and/or encoding video data by an electronic device, in accordance with one or more example implementations of this disclosure. The method/process 700 is an example implementation, as there may be a variety of ways of decoding the video data.

The method/process 700 may be performed by an electronic device using the configurations illustrated in FIGS. 1 and 2, where various elements of these figures may be referenced to describe the method/process 700. Each block illustrated in FIG. 7 may represent one or more processes, methods, or subroutines performed by an electronic device.

The order in which the blocks appear in FIG. 7 is for illustration only, and may not be construed to limit the scope of the present disclosure, thus may be different from what is illustrated. Additional blocks may be added or fewer blocks may be utilized without departing from the scope of the present disclosure.

At block 710, the method/process 700 may start by the decoder module 124 receiving the video data. The video data received by the decoder module 124 may include a bitstream. With reference to FIGS. 1 and 2, the second electronic device 120 may receive the bitstream from an encoder, such as the first electronic device 110 (or other video providers), via the second interface 126. The second interface 126 may directly provide the bitstream to the decoder module 124 in some implementations.

At block 720, the decoder module 124 may determine a block unit from a current frame included in the video data. The determination, at block 720, may be identical to that at block 320. At block 730, the decoder module 124 may select, for the block unit, multiple reference matching blocks, from the current frame. The selection, at block 730, may be identical to that at block 330. At block 740, the decoder module 124 may determine, from the current frame, a current matching template, neighboring the block unit, and multiple reference matching templates, each neighboring, respectively, a corresponding one of the multiple reference matching blocks. The determination, at block 740, may be identical to that at block 340.

At block 750, the decoder module 124 may determine a reference filter model derived based on the current matching template and the multiple reference matching templates.

Figure 8:
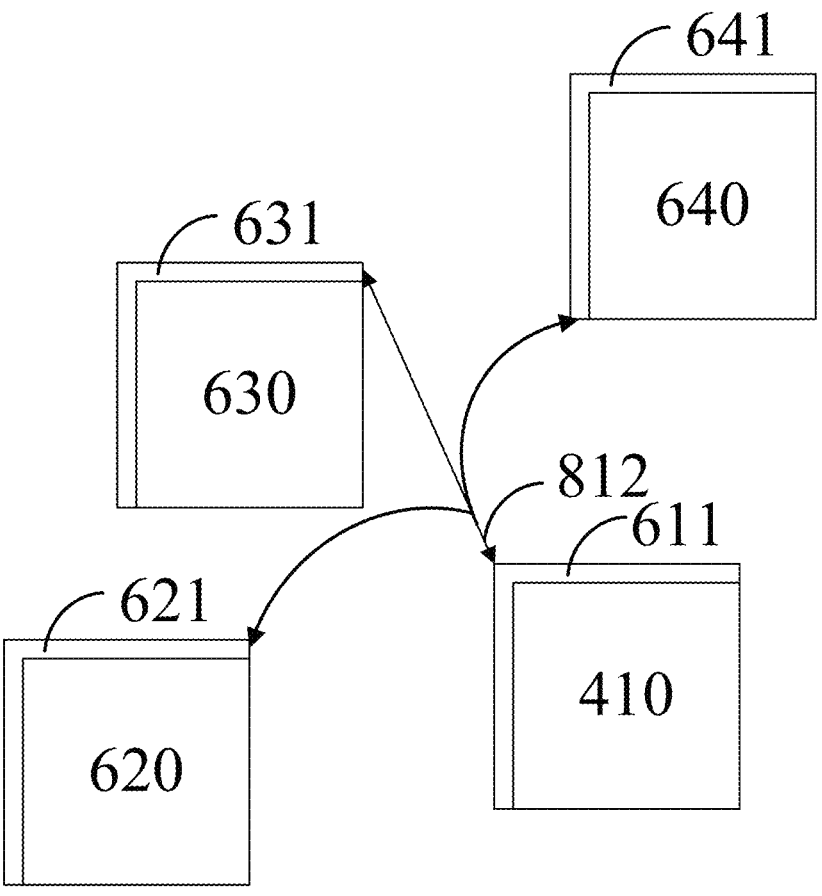
FIG. 8 is a schematic illustration of a block unit, the reference matching blocks, the current matching template, the reference matching templates, and the reference filter model, in accordance with one or more example implementations of this disclosure.

FIG. 8 is a schematic illustration of a block unit 410, the reference matching blocks 620-640, the current matching template 611, the reference matching templates 621-641, and the reference filter model 812, in accordance with one or more example implementations of this disclosure. The reference filter model 812 may be derived based on the current matching template 611 and the reference matching templates 621-641.

The reference filter model may be generated by one of multiple filter types. The filter types may include a linear filter model and a non-linear filter model. The linear filter model may include an Nf-tap liner model and a gradient linear model. The number Nf, being a positive integer, may be predefined. For example, the number Nf may be equal to one of 2-15. The non-linear filter model may include a quadratic model, a cubic model, and a quartic model. In some implementations, when a degree of a reference filter model is equal to one, the reference filter model is one of the linear filter models. In some implementations, when the degree of the filter model is greater than one, the reference filter model is one of the non-linear filter models. It should be noted that additional reference filters may be added without departing from the scope of the present disclosure.

In some implementations, the filter type of the reference filter model may be a 7-tap linear model, when the number of reference matching blocks is equal to or greater than two. In some implementations, the number of spatial sample terms of a reference matching block corresponding a reference matching template with the lower reference template cost may be greater than or equal to the number of spatial sample terms of another reference matching block corresponding another reference matching template with the greater reference template cost.

The 7-tap linear model may include seven spatial sample terms and one bias term B. The seven spatial sample terms may include a center sample $C_1$ located at a sample position (i, j) relative to the top-left luma sample of a first reference matching block, a north sample $N_1$ located at a sample position (i, j−1) relative to the top-left luma sample of the first reference matching block and located above the center sample $C_1$, and a south sample $S_1$ located at a sample position (i, j+1) relative to the top-left luma sample of the first reference matching block and located below the center sample $C_1$. In addition, the seven spatial sample terms may further include a west sample $W_1$ located at a sample position (i−1, j) relative to the top-left luma sample of the first reference matching block and located on the left side of the center sample $C_1$, and an east sample $E_1$ located at a sample position (i+1, j) relative to the top-left luma sample of the first reference matching block and located on the right side of the center sample $C_1$. Furthermore, beside the samples in the first reference matching block, the seven spatial sample terms may further include a center sample $C_2$ located at a sample position (i, j) relative to the top-left luma sample of the second reference matching block and a center sample $C_3$ located at a sample position (i, j) relative to the top-left luma sample of the third reference matching block. Thus, the 7-tap linear model may be shown in the following function:

$$predLumaVal =$$

$$c_0 \times C_1 + c_1 \times N_1 + c_2 \times S_1 + c_3 \times W_1 + c_4 \times E_1 + c_5 \times C_2 + c_6 \times C_3 + c_7 \times B$$

where the coefficients $c_0$, $c_1$, $c_2$, $c_3$, $c_4$, $c_5$, $c_6$, and $c_7$ are eight linear filter coefficients for the spatial sample terms $C_1$, $N_1$, $S_1$, $W_1$, $E_1$, $C_2$, and $C_3$, and the bias term B, and predLumaVal may be a predicted luma sample located at a sample position (i, j) relative to the top-left luma sample of the block unit.

In some other implementations, the filter type of the reference filter model may be a 9-tap linear model. Thus, besides the seven spatial sample terms in the 7-tap linear model, the reference filter model may further include two spatial sample terms of the second reference matching block. The two spatial sample terms of the second reference matching block may include two of a north sample $N_2$, a south sample $S_2$, a west sample $W_2$ and an east sample $E_2$. For example, the two spatial sample terms of the second reference matching block may include the north sample $N_2$ and the west sample $S_2$. The north sample $N_2$ may be located at a sample position (i, j−1) relative to the top-left luma sample of the second reference matching block and located above the center sample $C_2$, and the south sample $S_2$ may be located at a sample position (i, j+1) relative to the top-left luma sample of the second reference matching block and located below the center sample $C_2$. In addition, the west sample $W_2$ may be located at a sample position (i−1, j) relative to the top-left luma sample of the second reference matching block and located on the left side of the center sample $C_2$, and the east sample $E_2$ may be located at a sample position (i+1, j) relative to the top-left luma sample of the second reference matching block and located on the right side of the center sample $C_2$. Thus, the 9-tap linear model may be shown in the following function:

$$predLumaVal = c_0 \times C_1 + c_1 \times N_1 + c_2 \times S_1 + c_3 \times W_1 +$$

$$c_4 \times E_1 + c_5 \times C_2 + c_6 \times E_2 + c_7 \times W_2 + c_8 \times C_3 + c_9 \times B$$

where the coefficients $c_0$, $c_1$, $c_2$, $c_3$, $c_4$, $c_5$, $c_6$, $c_7$, $c_8$, and $c_9$ are eight linear filter coefficients for the spatial sample terms $C_1$, $N_1$, $S_1$, $W_1$, $E_1$, $C_2$, $E_2$, $W_2$, and $C_3$, and the bias term B, and predLumaVal may be a predicted luma sample located at a sample position (i, j) relative to the top-left luma sample of the block unit.

In some other implementations, the filter type of the reference filter model may be a 11-tap linear model. Thus, besides the seven spatial sample terms in the 7-tap linear model, the reference filter model may further include two spatial sample terms of the second reference matching block and two spatial sample terms of the third reference matching block. The two spatial sample terms of the second reference matching block may include two of the north sample $N_2$, the south sample $S_2$, the west sample $W_2$ and the east sample $E_2$.

For example, the two spatial sample terms of the second reference matching block may include the north sample $N_2$ and the west sample $W_2$. The two spatial sample terms of the third reference matching block may include two of a north sample $N_3$, a south sample $S_3$, a west sample $W_3$ and an east sample $E_3$. For example, the two spatial sample terms of the third reference matching block may include the north sample $N_3$ and the east sample $E_3$. Thus, in some implementations, the 11-tap linear model may be shown in the following function:

$$predLumaVal = c_0 \times C_1 + c_1 \times N_1 + c_2 \times S_1 + c_3 \times W_1 + c_4 \times E_1 +$$
$$c_5 \times C_2 + c_6 \times E_2 + c_7 \times W_2 + c_8 \times C_3 + c_9 \times E_3 + c_{10} \times W_3 + c_{11} \times B$$

where the coefficients $c_0$, $c_1$, $c_2$, $c_3$, $c_4$, $c_5$, $c_6$, $c_7$, $c_8$, $c_9$, $c_{10}$ and $c_{11}$ are twelve linear filter coefficients for the spatial sample terms $C_1$, $N_1$, $S_1$, $W_1$, $E_1$, $C_2$, $E_2$, $W_2$, $C_3$, $E_3$, and $W_3$, and the bias term B, and predLumaVal may be a predicted luma sample located at a sample position (i, j) relative to the top-left luma sample of the block unit.

In some other implementations, the filter type of the reference filter model may be a 13-tap linear model. Thus, besides the seven spatial sample terms in the 7-tap linear model, the reference filter model may include fourth spatial sample terms of the second reference matching block and two spatial sample terms of the third reference matching block. The four spatial sample terms of the second reference matching block may include the north sample $N_2$, the south sample $S_2$, the west sample $W_2$ and the east sample $E_2$. The two spatial sample terms of the third reference matching block may include two of the north sample $N_3$, the south sample $S_3$, the west sample $W_3$ and the east sample $E_3$.

In some other implementations, the filter type of the reference filter model may be a 15-tap linear model. Thus, besides the seven spatial sample terms in the 7-tap linear model, the reference filter model may include fourth spatial sample terms of the second reference matching block and fourth spatial sample terms of the third reference matching block. The four spatial sample terms of the second reference matching block may include the north sample $N_2$, the south sample $S_2$, the west sample $W_2$ and the east sample $E_2$. The fourth spatial sample terms of the third reference matching block may include the north sample $N_3$, the south sample $S_3$, the west sample $W_3$ and the east sample $E_3$.

In some other implementations, the filter type of the reference filter model may be a 9-tap linear model when the number of reference matching blocks is equal to five. Besides the seven spatial sample terms in the 7-tap linear model, the reference filter model may further include a center sample $C_4$ located at a sample position (i, j) relative to the top-left luma sample of the fourth reference matching block and a center sample $C_5$ located at a sample position (i, j) relative to the top-left luma sample of the fifth second reference matching block. Thus, the 9-tap linear model may be shown in the following function:

$$predLumaVal = c_0 \times C_1 + c_1 \times N_1 + c_2 \times S_1 + c_3 \times W_1 +$$
$$c_4 \times E_1 + c_5 \times C_2 + c_6 \times C_3 + c_7 \times C_4 + c_8 \times C_5 + c_9 \times B$$

where the coefficients $c_0$, $c_1$, $c_2$, $c_3$, $c_4$, $c_5$, $c_6$, $c_7$, $c_8$, and $c_9$ are ten linear filter coefficients for the spatial sample terms $C_1$, $N_1$, $S_1$, $W_1$, $E_1$, $C_2$, $C_3$, $C_4$, and $C_5$, and the bias term B, and predLumaVal may be a predicted luma sample located at a sample position (i, j) relative to the top-left luma sample of the block unit.

In some implementations, the filter type of the reference filter model may be the gradient linear model. The gradient linear model may include at least one first gradient term $G_1$, at least one second gradient term $G_2$ and a bias term B, when the number of reference matching blocks is equal to two. The at least one first gradient term $G_1$ may be generated by calculating a gradient value of the center sample located at the sample position (i, j) relative to the top-left luma sample of the first reference matching block. The at least one second gradient term $G_2$ may be generated by calculating a gradient value of the center sample located at the sample position (i, j) relative to the top-left luma sample of the second reference matching block. In some implementations, the gradient term may be a horizontal gradient $G_x$ by calculating the gradient value of the center sample along an x-axis, such as $G_{1x}$ and $G_{2x}$. In some other implementations, the gradient term may be a vertical gradient $G_y$ by calculating the gradient value of the center sample along a y-axis, such as $G_{1y}$ and $G_{2y}$. In yet, some other implementations, the gradient term may be a spatial gradient G by calculating the gradient value of the center sample, such as $G_1$ and $G_2$. Thus, the gradient linear model may be shown in the following function:

$$predLumaVal = (c_0 \times G_1) \gg k + (c_1 \times G_2) \gg k + c_2$$

where the coefficients $c_0$, $c_1$, and $c_2$ are three linear filter coefficients for the gradient terms $G_1$ and $G_2$ and the bias term B equal to 1, the coefficient k may be a shift value, and predLumaVal may be a predicted luma sample located at a sample position (i, j) relative to the top-left luma sample of the block unit. In some other implementations, the spatial sample terms of the second reference matching block may be added into the gradient linear model including at least one gradient term G, and at least one spatial sample term, and a bias term B at block 350 to generate the reference filter model used at block 750.

In some implementations, the filter type of the reference filter model may be the quadratic model. Besides the seven spatial sample terms in the 7-tap linear model. The quadratic model including a non-linear term P may be similar to a convolutional cross-component model (CCCM). Thus, the quadratic model may be shown in the following functions:

$$predLumaVal = c_0 \times C_1 + c_1 \times N_1 + c_2 \times S_1 +$$
$$c_3 \times W_1 + c_4 \times E_1 + c_5 \times P_1 + c_6 \times C_2 + c_7 \times C_3 + c_8 \times B$$
$$P = (C \times C + midVal) \gg bitDepth$$
$$B = 2^{bitDepth-1}$$

where the coefficients $c_0$, $c_1$, $c_2$, $c_3$, $c_4$, $c_5$, $c_6$, $c_7$, and $c_8$ are nine filter coefficients for the spatial sample terms $C_1$, $N_1$, $S_1$, $W_1$, $E_1$, $C_2$, and, $C_3$, the non-linear term $P_1$, and the bias term B, and predLumaVal may be a predicted luma sample located at a sample position (i, j) relative to the top-left luma sample of the block unit. In addition, the parameter midVal and the bias term B may be set as to a middle luma value, the parameter bitDepth may be a bit depth of the samples in the bitstream. For example, the bias term B may be set as 512 for 10 bits content.

A set of filter coefficients in the reference filter model may be derived by comparing the reconstructed samples of the current matching template with multiple predicted samples of the current matching template generated based on the reference candidate templates. In some implementations, the difference minimization of the comparison may be performed by an MSE minimization. In some implementations, the MSE minimization may be performed by calculating an autocorrelation matrix. The autocorrelation matrix may be LDL decomposition and the convolution filter coefficients may be calculated using back-substitution. In some implementations, the decomposition may be Cholesky decomposition. In some implementations, the difference minimization may be performed by a Gaussian elimination. It should be noted that the derivation scheme for the set of filter coefficients may be changed without departing from the scope of the present disclosure.

Referring back to FIG. 7, at block 760, the decoder module 124 may filter the multiple reference matching blocks based on the reference filter model to generate a filtered reference block.

With reference to FIGS. 1 and 2, the decoder module 124 may filter each of the reference matching blocks based on the reference filter model to generate the filtered reference block. For example, with reference to FIG. 6, the decoder module 124 may filter the reference matching blocks 620-640 using the reference filter model 812 to generate the filtered reference block for the block unit. Thus, the filtered reference block may be generated by filtering all of the reference matching blocks using the reference filter model.

At block 770, the decoder module 124 may reconstruct the block unit based on the filtered reference block.

With reference to FIGS. 1 and 2, in some implementations, the decoder module 124 may reconstruct the block unit based on the filtered reference block. The filtered reference block may be directly set as a predicted block. In some other implementations, the decoder module 124 may further weightedly combine the filtered reference block with at least one of the reference matching blocks (i.e., the unfiltered reference matching blocks) to generate the predicted block. In addition, the decoder module 124 may weightedly combine the predicted block with the at least one of the reference matching blocks to generate the predicted block further based on multiple weighting values. The weighting values may be predefined. The decoder module 124 may determine multiple residual components from the bitstream for the block unit and add the residual components into the predicted block to reconstruct the block unit. The decoder module 124 may reconstruct all of the other block units in the image frame for reconstructing the image frame and the video. The method/process 700 may then end.

Figure 9:
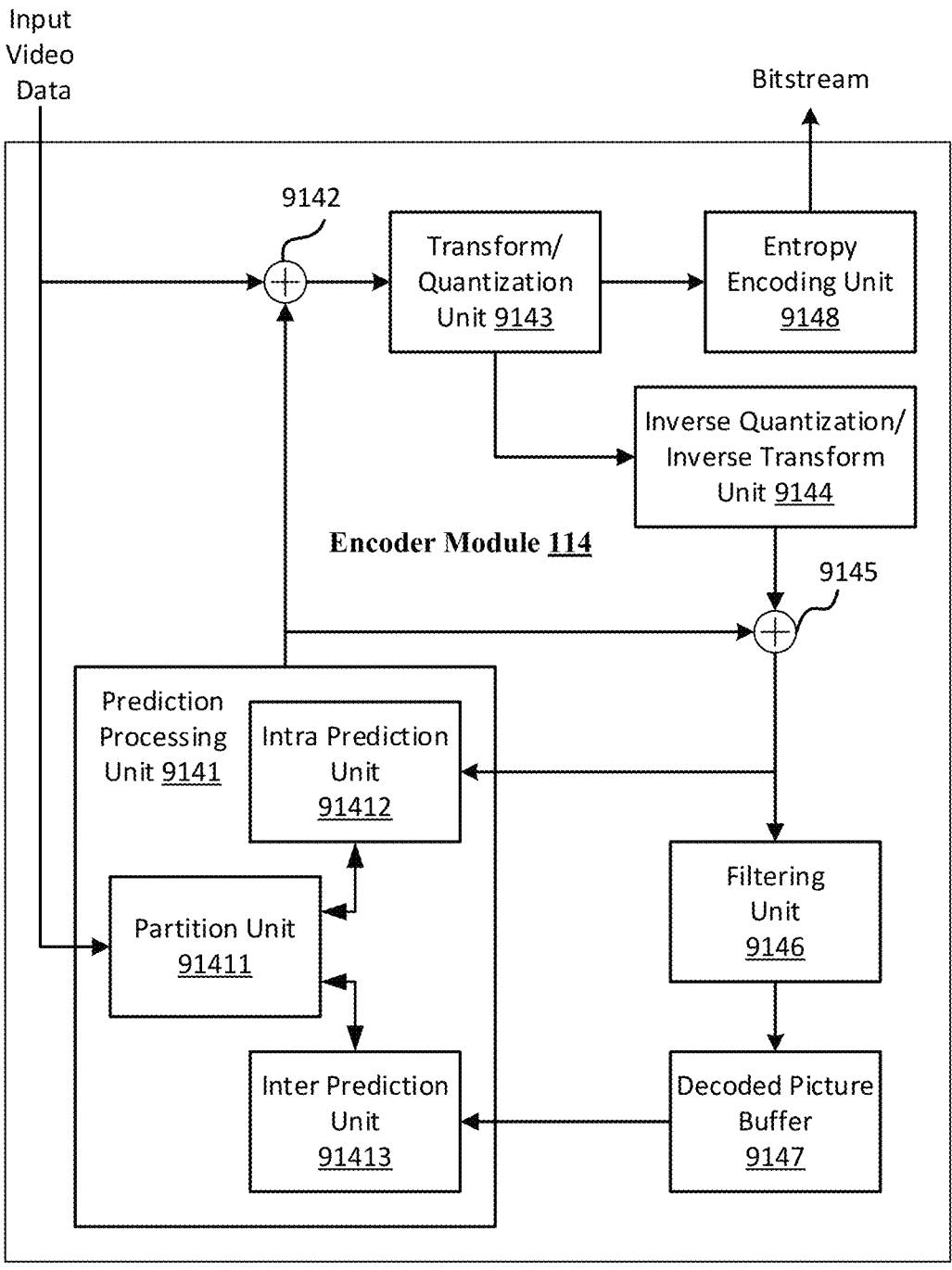
FIG. 9 is a block diagram illustrating an encoder module of the first electronic device illustrated in FIG. 1, in accordance with one or more example implementations of this disclosure.

FIG. 9 is a block diagram illustrating an encoder module 114 of the first electronic device 110 illustrated in FIG. 1, in accordance with one or more example implementations of this disclosure. The encoder module 114 may include a prediction processor (e.g., a prediction processing unit 9141), at least a first summer (e.g., a first summer 9142) and a second summer (e.g., a second summer 9145), a transform/quantization processor (e.g., a transform/quantization unit 9143), an inverse quantization/inverse transform processor (e.g., an inverse quantization/inverse transform unit 9144), a filter (e.g., a filtering unit 9146), a decoded picture buffer (e.g., a decoded picture buffer 9147), and an entropy encoder (e.g., an entropy encoding unit 9148). The prediction processing unit 9141 of the encoder module 114 may further include a partition processor (e.g., a partition unit 91411), an intra prediction processor (e.g., an intra prediction unit 91412), and an inter prediction processor (e.g., an inter prediction unit 91413). The encoder module 114 may receive the source video and encode the source video to output a bitstream.

The encoder module 114 may receive source video including multiple image frames and then divide the image frames according to a coding structure. Each of the image frames may be divided into at least one image block.

The at least one image block may include a luminance block having multiple luminance samples and at least one chrominance block having multiple chrominance samples. The luminance block and the at least one chrominance block may be further divided to generate macroblocks, CTUs, CBs, sub-divisions thereof, and/or other equivalent coding units.

The encoder module 114 may perform additional sub-divisions of the source video. It should be noted that the disclosed implementations are generally applicable to video coding regardless of how the source video is partitioned prior to and/or during the encoding.

During the encoding process, the prediction processing unit 9141 may receive a current image block of a specific one of the image frames. The current image block may be the luminance block or one of the chrominance blocks in the specific image frame.

The partition unit 91411 may divide the current image block into multiple block units. The intra prediction unit 91412 may perform intra-predictive coding of a current block unit relative to one or more neighboring blocks in the same frame as the current block unit in order to provide spatial prediction. The inter prediction unit 91413 may perform inter-predictive coding of the current block unit relative to one or more blocks in one or more reference image blocks to provide temporal prediction.

The prediction processing unit 9141 may select one of the coding results generated by the intra prediction unit 91412 and the inter prediction unit 91413 based on a mode selection method, such as a cost function. The mode selection method may be a rate-distortion optimization (RDO) process.

The prediction processing unit 9141 may determine the selected coding result and provide a predicted block corresponding to the selected coding result to the first summer 9142 for generating a residual block and to the second summer 9145 for reconstructing the encoded block unit. The prediction processing unit 9141 may further provide syntax elements, such as motion vectors, intra-mode indicators, partition information, and/or other syntax information, to the entropy encoding unit 9148.

The intra prediction unit 91412 may intra-predict the current block unit. The intra prediction unit 91412 may determine an intra prediction mode directed toward a reconstructed sample neighboring the current block unit in order to encode the current block unit.

The intra prediction unit 91412 may encode the current block unit using various intra prediction modes. The intra prediction unit 91412 of the prediction processing unit 9141 may select an appropriate intra prediction mode from the selected modes. The intra prediction unit 91412 may encode the current block unit using a cross-component prediction mode to predict one of the two chroma components of the current block unit based on the luma components of the current block unit. The intra prediction unit 91412 may predict a first one of the two chroma components of the current block unit based on the second of the two chroma components of the current block unit.

The inter prediction unit 91413 may inter-predict the current block unit as an alternative to the intra prediction performed by the intra prediction unit 91412. The inter prediction unit 91413 may perform motion estimation to estimate motion of the current block unit for generating a motion vector.

The motion vector may indicate a displacement of the current block unit within the current image block relative to a reference block unit within a reference image block. The inter prediction unit 91413 may receive at least one reference image block stored in the decoded picture buffer 9147 and estimate the motion based on the received reference image blocks to generate the motion vector.

The first summer 9142 may generate the residual block by subtracting the prediction block determined by the prediction processing unit 9141 from the original current block unit. The first summer 9142 may represent the component or components that perform this subtraction.

The transform/quantization unit 9143 may apply a transform to the residual block in order to generate a residual transform coefficient and then quantize the residual transform coefficients to further reduce the bit rate. The transform may be one of a DCT, DST, AMT, MDNSST, HyGT, signal-dependent transform, KLT, wavelet transform, integer transform, sub-band transform, and a conceptually similar transform.

The transform may convert the residual information from a pixel value domain to a transform domain, such as a frequency domain. The degree of quantization may be modified by adjusting a quantization parameter.

The transform/quantization unit 9143 may perform a scan of the matrix including the quantized transform coefficients. Alternatively, the entropy encoding unit 9148 may perform the scan.

The entropy encoding unit 9148 may receive multiple syntax elements from the prediction processing unit 9141 and the transform/quantization unit 9143, including a quantization parameter, transform data, motion vectors, intra modes, partition information, and/or other syntax information. The entropy encoding unit 9148 may encode the syntax elements into the bitstream.

The entropy encoding unit 9148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120, as shown in FIG. 1) or archived for later transmission or retrieval.

The inverse quantization/inverse transform unit 9144 may apply inverse quantization and inverse transformation to reconstruct the residual block in the pixel domain for later use as a reference block. The second summer 9145 may add the reconstructed residual block to the prediction block provided by the prediction processing unit 9141 in order to produce a reconstructed block for storage in the decoded picture buffer 9147.

The filtering unit 9146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 9145.

The decoded picture buffer 9147 may be a reference picture memory that stores the reference block to be used by the encoder module 914 to encode video, such as in intra-coding or inter-coding modes. The decoded picture buffer 9147 may include a variety of memory devices, such as DRAM (e.g., including SDRAM), MRAM, RRAM, or other types of memory devices. The decoded picture buffer 9147 may be on-chip with other components of the encoder module 114 or off-chip relative to those components.

The method/process 300 for decoding and/or encoding video data may be performed by the first electronic device 110. With reference to FIGS. 1, 3, and 9, at block 310, the method/process 300 may start by the encoder module 114 receiving the video data. The video data received by the encoder module 114 may be a video. At block 320, the encoder module 114 may determine a block unit from a current frame included in the video data. The encoder module 114 may divide the current frame to generate multiple CTUs, and further divide a current CTU included in the CTUs to generate multiple divided blocks and to determine the block unit from the divided blocks according to the partition indications based on any video coding standard.

At block 330, the encoder module 114 may select, for the block unit, multiple reference matching blocks, from the current frame. With reference to FIGS. 1, 3, and 9, the selection scheme of the reference matching blocks by the encoder module 114 may be identical to the selection scheme of the reference matching blocks by the decoder module 124. In addition, the reference matching blocks selected by the encoder module 114 may also be identical to the reference matching blocks selected by the decoder module 124.

At block 340, the encoder module 114 may determine, from the current frame, a current matching template, neighboring the block unit, and multiple reference matching templates, each neighboring, respectively, a corresponding one of the multiple reference matching blocks.

With reference to FIGS. 1, 3, and 9, in some implementations, the shape and the size of the current matching temple and the reference matching templates may be selected from multiple template size candidates by the encoder module 114. Thus, the encoder module 114 may encode a filter template index into the bitstream for the decoder module 124 to select the one of the template size candidates. The encoder module 114 may determine multiple current matching templates neighboring the block unit based on the template size candidates. In addition, the encoder module 114 may also determine multiple reference matching templates for each of the reference matching blocks based on the template size candidates. The selected template size candidate may be determined at the following blocks of the method/process 300.

In some other implementations, the current matching template and the reference matching templates determined by the encoder module 114 may also be identical to those determined by the decoder module 124, when the shape and the size of the current matching temple and the reference matching templates is predefined. In yet, some other implementations, the shape and the size of the current matching temple and the reference matching templates may be predefined to be identical to those of the current candidate template and the reference candidate templates. Thus, the decoder module 124 may still determine the shape and the size of the current matching temple and the reference matching templates by itself, even if the encoder module 114 does not encode a filter template index into the bitstream.

At block 350, the encoder module 114 may determine multiple reference filter models, each respectively derived based on the current matching template and a corresponding one of the multiple reference matching templates. In addition, each of the reference filter models may be associated, respectively, with a corresponding one of the reference matching blocks.

With reference to FIGS. 1, 3, and 9, the encoder module 114 may determine multiple reference filter models for each of the reference matching templates. A reference filter model for a specific one of the reference matching templates may be generated based on one of multiple filter types and one of the template size candidates. In some implementations, the filter types used by the encoder module 114 may be identical to the filter types used by the decoder module 124. In some other implementations, besides the filter types used by the decoder module 124, the filter types used by the encoder module 114 may further include other filter types. The filter types described for the decoder module 124 in the method/process 300 may also be used for the encoder module 114. In addition, the derivation scheme of the filter coefficients by the encoder module 114 may be identical to the derivation scheme of the filter coefficients by the decoder module 124.

At block 360, the encoder module 114 may filter the multiple reference matching blocks based on the multiple reference filter models to generate multiple filtered reference blocks. With reference to FIGS. 1, 3, and 9, the filtering scheme by the encoder module 114 may be identical to the filtering scheme by the decoder module 124. The number of reference filter models for each of the reference matching blocks generated by the encoder module 114 may be much greater than the number of reference filter model, being equal to one, for each of the reference matching blocks generated by the decoder module 124. Thus, the number of filtered reference blocks generated by the encoder module 114 may be much greater than the number of filtered reference blocks, being equal to the number of reference matching blocks, generated by the decoder module 124.

At block 370, the encoder module 114 may reconstruct the block unit based on the multiple filtered reference blocks. With reference to FIGS. 1, 3, and 9, in some implementations, the encoder module 114 may select one of the filtered reference blocks for each of the reference matching blocks and weightedly combine the selected filtered reference blocks to generate one of multiple predicted blocks. The derivation scheme of the weighting parameters by the encoder module 114 may be identical to the derivation scheme of the weighting parameters by the decoder module 124. In some other implementations, the encoder module 114 may further weightedly combine the selected filtered reference blocks with at least one of the reference matching blocks (i.e., the unfiltered reference matching blocks) corresponding to the selected filtered reference blocks to generate another one of the predicted blocks. In addition, the encoder module 114 may weightedly combine the selected filtered reference blocks with the at least one of the reference matching blocks to generate the another one of the predicted blocks further based on multiple weighting values. The weighting values may be predefined.

The encoder module 114 may predict the block unit based on other prediction modes to generate multiple prediction blocks. In some implementations, the encoder module 114 may select one of the prediction blocks and the predicted blocks based on a mode selection method, such as a cost function. The mode selection method may be a rate-distortion optimization (RDO) process. In addition, the selected template size candidate may also be determined based on the mode selection method. The encoder module 114 may provide the selected coding result to the first summer 9142 for generating a residual block and to the second summer 9145 for reconstructing the encoded block unit. The encoder module 114 may further provide syntax elements, such as an IntraTMP template index and a filter template flag, included in the bitstream for transmitting to the decoder module 124. The reconstruction of the block unit by the encoder module 114 may be identical to the reconstruction of the block unit by the decoder module 124. The method/process 300 for the encoder module 114 may then end.

The method/process 700 for decoding and/or encoding video data may be performed by the first electronic device 110. With reference to FIGS. 1, 7, and 9, at block 710, the method/process 700 may start by the encoder module 114 receiving the video data. The video data received by the encoder module 114 may be a video. At block 720, the encoder module 114 may determine a block unit from a current frame included in the video data. The encoder module 114 may divide the current frame to generate multiple CTUs, and further divide a current CTU included in the CTUs to generate multiple divided blocks and to determine the block unit from the divided blocks according to the partition indications based on any video coding standard.

At block 730, the encoder module 114 may select, for the block unit, multiple reference matching blocks, from the current frame. With reference to FIGS. 1, 7, and 9, the selection scheme of the reference matching blocks by the encoder module 114 may be identical to the selection scheme of the reference matching blocks by the decoder module 124. In addition, the reference matching blocks selected by the encoder module 114 may also be identical to the reference matching blocks selected by the decoder module 124.

At block 740, the encoder module 114 may determine, from the current frame, a current matching template, neighboring the block unit, and multiple reference matching templates, each neighboring, respectively, a corresponding one of the multiple reference matching blocks. With reference to FIGS. 1, 7, and 9, the determination scheme of the at least one current matching template and the reference matching templates at block 740 by the encoder module 114 may be identical to the determination scheme of the at least one current matching template and the reference matching templates at block 340 by the encoder module 114. In addition, the at least one current matching template and the reference matching templates determined by the encoder module 114 in the method/process 700 may also be identical to the at least one current matching template and the reference matching templates determined by the encoder module 114 in the method/process 300.

At block 750, the encoder module 114 may determine a reference filter model derived based on the current matching template and the multiple reference matching templates.

With reference to FIGS. 1, 7, and 9, the encoder module 114 may determine multiple reference filter models. A reference filter model may be generated based on one of multiple filter types and one of the template size candidates. In some implementations, the filter types used by the encoder module 114 may be identical to the filter types used by the decoder module 124. In some other implementations, besides the filter types used by the decoder module 124, the filter types used by the encoder module 114 may further include other filter types. The filter types described for the decoder module 124 in the method/process 700 may also be used for the encoder module 114. In addition, the derivation scheme of the filter coefficients by the encoder module 114 may be identical to the derivation scheme of the filter coefficients by the decoder module 124.

At block 760, the encoder module may 114 filter the multiple reference matching blocks based on the reference filter model to generate a filtered reference block. With reference to FIGS. 1, 7, and 9, the filtering scheme by the encoder module 114 may be identical to the filtering scheme by the decoder module 124. The number of reference filter models generated by the encoder module 114 may be greater than the number of reference filter model, equal to 1, generated by the decoder module 124. Thus, the number of filtered reference blocks generated by the encoder module 114 may be greater than the number of filtered reference block, equal to one, generated by the decoder module 124.

At block 770, the encoder module 114 may reconstruct the block unit based on the filtered reference block.

With reference to FIGS. 1, 7, and 9, the encoder module 114 may predict the block unit based on other prediction modes to generate multiple prediction blocks. In some implementations, the encoder module 114 may set the filtered reference block as a predicted block. In some other implementations, the encoder module 114 may further weightedly combine one of the filtered reference blocks with at least one of the reference matching blocks (i.e. the unfiltered reference matching blocks) to generate another one of the predicted blocks. In addition, the encoder module 114 may weightedly combine the one of the filtered reference blocks with the at least one of the reference matching blocks to generate the another one of the predicted blocks further based on multiple weighting values. The weighting values may be predefined. The encoder module 114 may select one of the prediction blocks and the predicted blocks based on a mode selection method. The mode selection method may be a rate-distortion optimization (RDO) process. In addition, the selected template size candidate may also be determined based on the mode selection method. The encoder module 114 may provide the selected coding result to the first summer 9142 for generating a residual block and to the second summer 9145 for reconstructing the encoded block unit. The encoder module 114 may further provide syntax elements, such as an IntraTMP template index and a filter template flag, included in the bitstream for transmitting to the decoder module 124. The reconstruction of the block unit by the encoder module 114 may be identical to the reconstruction of the block unit by the decoder module 124. The method/process 700 for the encoder module 114 may then end.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of decoding video data performed by an electronic device, the method comprising:
  receiving the video data;
  determining a block unit from a current frame that is included in the video data;
  selecting, for the block unit, a plurality of reference matching blocks from the current frame;
  determining, from the current frame, a current matching template, neighboring the block unit, and a plurality of reference matching templates, each neighboring a corresponding one of the plurality of reference matching blocks;

determining a plurality of reference filter models, each derived based on the current matching template and a corresponding one of the plurality of reference matching templates;
  filtering the plurality of reference matching blocks based on the plurality of reference filter models to generate a plurality of filtered reference blocks; and
  reconstructing the block unit based on the plurality of filtered reference blocks, wherein:
    the current matching template and the plurality of reference matching templates have a first matching template size when a block size of the block unit is greater than or equal to a threshold size,
    the current matching template and the plurality of reference matching templates have a second matching template size when the block size of the block unit is less than the threshold size, and
    the second matching template size is greater than the first matching template size.

2. The method according to claim 1, further comprising:
  determining a plurality of reference candidate blocks from a search area of the block unit, the search area being included in the current frame;
  determining, from the current frame, a current candidate template, neighboring the block unit, and a plurality of reference candidate templates, each neighboring a corresponding one of the plurality of reference candidate blocks; and
  determining a plurality of reference template costs, each generated by comparing a corresponding one of the plurality of reference candidate templates with the current candidate template,
  wherein selecting the plurality of reference matching blocks from the search area of the block unit is further based on the plurality of reference template costs.

3. The method according to claim 2, wherein a candidate template size of the current candidate template is different from a matching template size of the current matching template, the matching template size being selected from the first matching template size and the second matching template size.

4. The method according to claim 1, wherein the plurality of reference filter models comprises a plurality of linear filter models, each including a set of linear filter coefficients.

5. The method according to claim 4, wherein each set of linear filter coefficients in the plurality of reference filter models is different from other sets of linear filter coefficients in the plurality of reference filter models.

6. The method according to claim 1, wherein each of the plurality of filtered reference blocks is generated by filtering a corresponding one of the plurality of reference matching blocks based on one of the plurality of reference filter models that is associated with the one of the plurality of reference matching blocks.

7. The method according to claim 1, further comprising:
  weightedly combining the plurality of filtered reference blocks to generate a predicted block, wherein reconstructing the block unit is further based on the predicted block.

8. The method according to claim 7, further comprising:
  comparing each of the plurality of reference matching templates with the current matching template to generate a corresponding one of a plurality of comparing results; and
  determining a plurality of weighting parameters based on the plurality of comparing results, wherein weightedly combining the plurality of filtered reference blocks is further based on the plurality of weighting parameters.

9. An electronic device for decoding video data, the electronic device comprising:

at least one processor; and at least one non-transitory computer-readable medium coupled to the at least one processor and storing one or more computer-executable instructions that, when executed by the at least one processor, cause the electronic device to:

receive the video data;

determine a block unit from a current frame that is included in the video data;

select, for the block unit, a plurality of reference matching blocks from the current frame;

determine, from the current frame, a current matching template, neighboring the block unit, and a plurality of reference matching templates, each neighboring a corresponding one of the plurality of reference matching blocks;

determine a plurality of reference filter models, each derived based on the current matching template and a corresponding one of the plurality of reference matching templates;

filter the plurality of reference matching blocks based on the plurality of reference filter models to generate a plurality of filtered reference blocks; and reconstruct the block unit based on the plurality of filtered reference blocks, wherein:

the current matching template and the plurality of reference matching templates have a first matching template size when a block size of the block unit is greater than or equal to a threshold size, the current matching template and the plurality of reference matching templates have a second matching template size when the block size of the block unit is less than the threshold size, and the second matching template size is greater than the first matching template size.

10. The electronic device according to claim 9, wherein the one or more computer-executable instructions, when executed by the at least one processor, further cause the electronic device to:

determine a plurality of reference candidate blocks from a search area of the block unit, the search area being included in the current frame;

determine, from the current frame, a current candidate template, neighboring the block unit, and a plurality of reference candidate templates, each neighboring a corresponding one of the plurality of reference candidate blocks; and determine a plurality of reference template costs, each generated by comparing a corresponding one of the plurality of reference candidate templates with the current candidate template, wherein selecting the plurality of reference matching blocks from the search area of the block unit is further based on the plurality of reference template costs.

11. The electronic device according to claim 10, wherein a candidate template size of the current candidate template is different from a matching template size of the current matching template, the matching template size being selected from the first matching template size and the second matching template size.

12. The electronic device according to claim 9, wherein the plurality of reference filter models comprises a plurality of linear filter models, each including a set of linear filter coefficients.

13. The electronic device according to claim 12, wherein each set of linear filter coefficients in the plurality of reference filter models is different from other sets of linear filter coefficients in the plurality of reference filter models.

14. The electronic device according to claim 9, wherein each of the plurality of filtered reference blocks is generated by filtering a corresponding one of the plurality of reference matching blocks based on one of the plurality of reference filter models that is associated with the one of the plurality of reference matching blocks.

15. The electronic device according to claim 9, wherein the one or more computer-executable instructions, when executed by the at least one processor, further cause the electronic device to:

weightedly combine the plurality of filtered reference blocks to generate a predicted block, wherein reconstructing the block unit is further based on the predicted block.

16. The electronic device according to claim 15, wherein the one or more computer-executable instructions, when executed by the at least one processor, further cause the electronic device to:

compare each of the plurality of reference matching templates with the current matching template to generate a corresponding one of a plurality of comparing results; and determine a plurality of weighting parameters based on the plurality of comparing results, wherein weightedly combining the plurality of filtered reference blocks is further based on the plurality of weighting parameters.

* * * * *